United States Patent
Ducote, Jr. et al.

(10) Patent No.: US 12,313,338 B2
(45) Date of Patent: May 27, 2025

(54) SIDE DRAW REFLUX HEAVY HYDROCARBON REMOVAL SYSTEM AND METHOD

(71) Applicant: Chart Energy & Chemicals, Inc., Ball Ground, GA (US)

(72) Inventors: Douglas A. Ducote, Jr., The Woodlands, TX (US); Timothy P. Gushanas, Pearland, TX (US); Mark R. Glanville, The Woodlands, TX (US); Ravikumar Vipperla, Katy, TX (US); Peter J. Turner, The Woodlands, TX (US); Brent A. Heyrman, The Woodlands, TX (US)

(73) Assignee: Chart Energy & Chemicals, Inc., Ball Ground, GA (US)

( * ) Notice: Subject to any disclaimer, the term of this patent is extended or adjusted under 35 U.S.C. 154(b) by 344 days.

(21) Appl. No.: 17/743,811

(22) Filed: May 13, 2022

(65) Prior Publication Data
US 2022/0364789 A1 Nov. 17, 2022

Related U.S. Application Data

(60) Provisional application No. 63/188,846, filed on May 14, 2021.

(51) Int. Cl.
*F25J 3/06* (2006.01)
*B01D 53/00* (2006.01)

(52) U.S. Cl.
CPC ............ *F25J 3/061* (2013.01); *B01D 53/002* (2013.01); *F25J 2210/06* (2013.01); *F25J 2240/40* (2013.01); *F25J 2270/02* (2013.01)

(58) Field of Classification Search
None
See application file for complete search history.

(56) References Cited

U.S. PATENT DOCUMENTS

| 4,445,916 A | 5/1984 | Newton |
| 5,615,561 A | 4/1997 | Houshmand et al. |

(Continued)

FOREIGN PATENT DOCUMENTS

| WO | WO-0188447 A1 * | 11/2001 | ............ F25J 1/0022 |
| WO | WO2019/008107 A1 | 1/2019 | |

(Continued)

OTHER PUBLICATIONS

International Search Report and Written Opinion for International Application No. PCT/US2022/029194 Dated Sep. 15, 2022.

*Primary Examiner* — Gabriel E Gitman
(74) *Attorney, Agent, or Firm* — Cook Alex Ltd.

(57) ABSTRACT

A heavies removal heat exchanger cools at least a portion of a feed gas stream. A scrubbing section receives the cooled main feed gas stream. A stripping section receives a fluid stream from the scrubbing section. A stripping gas feed expansion device receives a portion of the feed gas stream and is in fluid communication with the stripping section. A side draw vapor line receives a vapor stream from the vapor outlet of the stripping section and is in fluid communication with a reflux stream cooling passage of the heavies removal heat exchanger. A reflux separation device receives fluid from the heavies removal heat exchanger and has a liquid outlet and a vapor outlet. The liquid outlet is in fluid communication with the scrubbing section. A return vapor expansion device receives a vapor stream from the scrubbing section and directs a cooled vapor stream to a return vapor stream warming passage of the heavies removal heat exchanger. The reflux separation device vapor outlet is configured so that fluid passing therethrough joins with fluid that has exited the return vapor expansion device either before or after the fluid that has exited the return vapor (Continued)

expansion device flows through the return vapor stream warming passage of the heavies removal heat exchanger.

49 Claims, 13 Drawing Sheets

(56) References Cited

U.S. PATENT DOCUMENTS

| | | |
|---|---|---|
| 6,269,657 B1 | 8/2001 | McNeil |
| 6,401,486 B1 | 6/2002 | Lee et al. |
| 6,405,561 B1 | 6/2002 | Mortko et al. |
| 6,601,406 B1 | 8/2003 | Deng et al. |
| 6,698,237 B2 | 3/2004 | Gaskin |
| 6,742,358 B2 | 6/2004 | Wilkinson et al. |
| 6,837,070 B2 | 1/2005 | Mak |
| 7,010,937 B2 | 3/2006 | Wilkinson et al. |
| 7,041,156 B2 | 5/2006 | Bras et al. |
| 7,051,553 B2 | 5/2006 | Mak et al. |
| 7,069,744 B2 | 7/2006 | Patel et al. |
| 7,073,350 B2 | 7/2006 | Mak |
| 7,155,931 B2 | 1/2007 | Wilkinson et al. |
| 7,210,311 B2 | 5/2007 | Wilkinson et al. |
| 7,216,507 B2 | 5/2007 | Cuellar et al. |
| 7,565,815 B2 | 7/2009 | Wilkinson et al. |
| 7,824,542 B2 | 11/2010 | Menzel |
| 8,209,996 B2 | 7/2012 | Mak |
| 8,528,361 B2 | 9/2013 | Nanda et al. |
| 8,881,549 B2 | 11/2014 | Johnke et al. |
| 8,910,495 B2 | 12/2014 | Mak |
| 9,021,831 B2 | 5/2015 | Johnke et al. |
| 9,052,136 B2 | 6/2015 | Johnke et al. |
| 9,052,137 B2 | 6/2015 | Johnke et al. |
| 9,057,558 B2 | 6/2015 | Johnke et al. |
| 9,068,774 B2 | 6/2015 | Johnke et al. |
| 9,074,814 B2 | 7/2015 | Johnke et al. |
| 9,080,811 B2 | 7/2015 | Johnke et al. |
| 9,132,379 B2 | 9/2015 | Mak |
| 9,523,055 B2 | 12/2016 | Russeff |
| 9,541,329 B2 | 1/2017 | Mak |
| 9,631,864 B2 | 4/2017 | Chen et al. |
| 9,683,177 B2 | 6/2017 | Russeff |
| 9,783,470 B2 | 10/2017 | Miller et al. |
| 10,227,273 B2 | 3/2019 | Miller et al. |
| 10,330,382 B2 | 6/2019 | Mak et al. |
| 10,352,616 B2 | 7/2019 | Currence |
| 10,495,379 B2 | 12/2019 | Nagavarapu et al. |
| 10,520,249 B2 | 12/2019 | Horne |
| 2006/0260355 A1 | 11/2006 | Roberts et al. |
| 2007/0056318 A1 | 3/2007 | Ransbarger |
| 2007/0157663 A1 | 7/2007 | Mak et al. |
| 2008/0115532 A1 | 5/2008 | Jager |
| 2008/0202162 A1 | 8/2008 | Mak |
| 2008/0271480 A1 | 11/2008 | Mak |
| 2009/0090049 A1 | 4/2009 | Chinn et al. |
| 2009/0293538 A1 | 12/2009 | Wilkinson et al. |
| 2010/0024477 A1 | 2/2010 | Roberts et al. |
| 2010/0281915 A1 | 11/2010 | Roberts et al. |
| 2012/0079852 A1 | 4/2012 | Northrop et al. |
| 2012/0085128 A1 | 4/2012 | Nanda et al. |
| 2013/0055757 A1 | 3/2013 | Huang et al. |
| 2013/0061633 A1 | 3/2013 | Mak et al. |
| 2014/0013796 A1 | 1/2014 | Malik et al. |
| 2014/0033762 A1 | 2/2014 | Chen et al. |
| 2014/0134710 A1 | 5/2014 | Grill |
| 2016/0216030 A1 | 7/2016 | Truong et al. |
| 2018/0066889 A1 | 3/2018 | Gaskin et al. |
| 2018/0266760 A1 | 9/2018 | Mak |
| 2019/0120550 A1 | 4/2019 | Mak |
| 2019/0128601 A1 | 5/2019 | Demolliens |
| 2019/0242645 A1 | 8/2019 | Mak et al. |
| 2019/0388828 A1 | 12/2019 | Doong |
| 2020/0033055 A1 | 1/2020 | Cortale et al. |

FOREIGN PATENT DOCUMENTS

| | | |
|---|---|---|
| WO | WO2019/078892 A1 | 4/2019 |
| WO | WO2019/226156 A1 | 11/2019 |
| WO | WO2019/246274 A1 | 12/2019 |

* cited by examiner

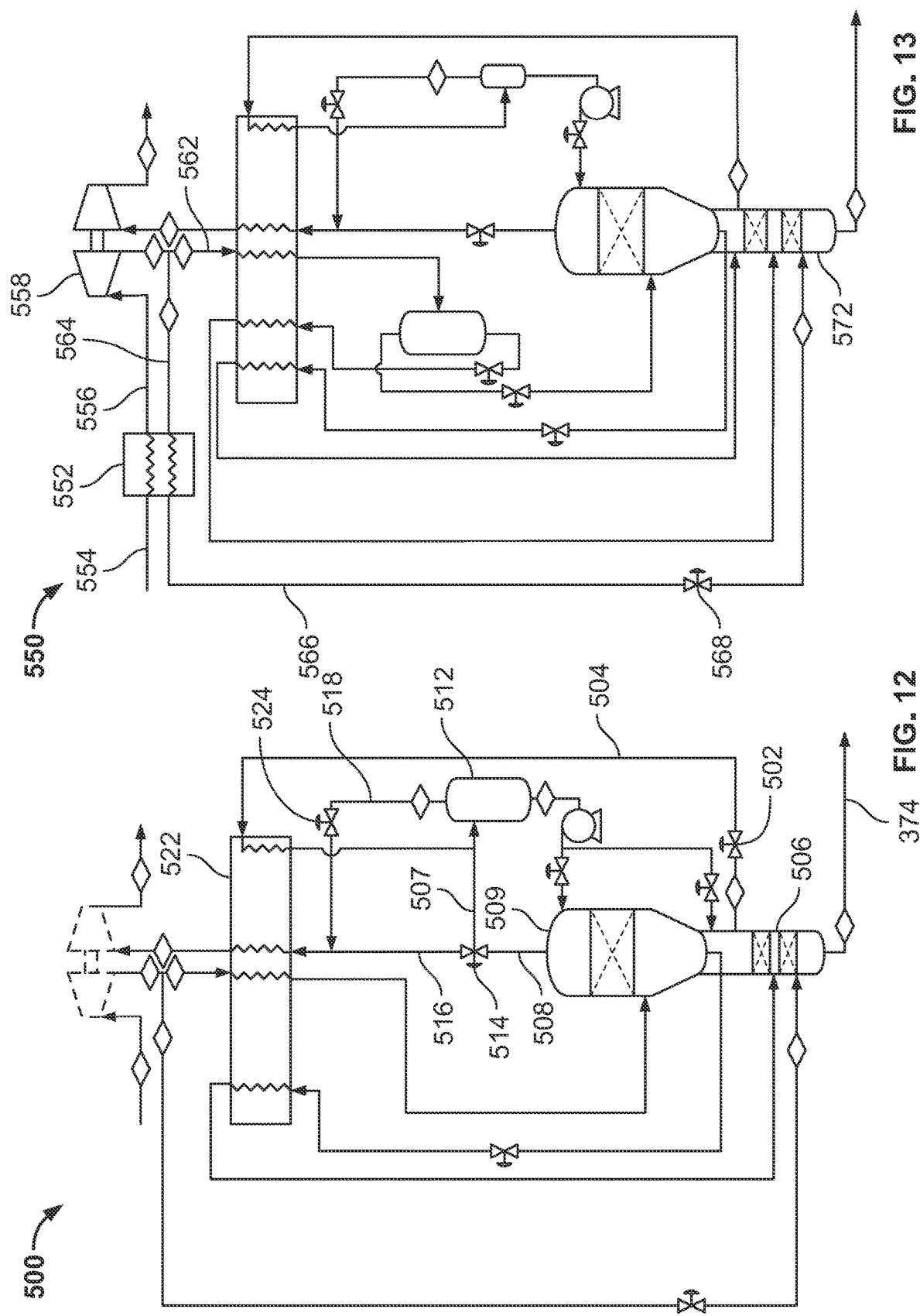

SIDE DRAW REFLUX HEAVY HYDROCARBON REMOVAL SYSTEM AND METHOD

CLAIM OF PRIORITY

This application claims the benefit of U.S. Provisional Application No. 63/188,846, filed May 14, 2021, the contents of which are hereby incorporated by reference.

FIELD OF THE DISCLOSURE

The present invention relates generally to systems and methods for processing gases and, more particularly, to a system and method for removing heavy hydrocarbon components from a feed gas.

BACKGROUND

Natural gas streams, or other methane-rich gas streams, are often liquefied for ease of transport and use. It is often desirable to process such feed gas streams to remove heavier hydrocarbons (hydrocarbons that are heavier than propane) so as to provide a higher methane purity in the resulting liquid natural gas product and a co-product liquid (natural gas liquids) that contains the heavy hydrocarbons. Such purified liquid natural gas products burn cleaner in LNG-powered vehicles so that less air pollution results. In addition, purifying the feed stream prior to liquefaction prevents freeze-up of the liquefying heat exchanger that would otherwise occur due to presence of heavy hydrocarbon components. The co-product liquid stream, rich in heavy hydrocarbons such as ethane, propane, butane and heavier hydrocarbons, have several valuable industrial uses. It is further desirable that such processing minimizes energy consumption given the volume of gas that must be purified.

SUMMARY OF THE DISCLOSURE

There are several aspects of the present subject matter which may be embodied separately or together in the methods, devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a system for removing heavy hydrocarbon components from a feed gas stream includes a heavies removal heat exchanger that has a main feed stream cooling passage, a reflux stream cooling passage and a return vapor stream warming passage. The main feed stream cooling passage of the heavies removal heat exchanger is configured to receive and cool at least a portion of the feed gas stream so as to produce a cooled main feed stream. A scrubbing section includes a main feed inlet, a liquid outlet, a return vapor outlet and a reflux inlet, where the main feed inlet is configured to receive the cooled main feed stream. A stripping section has a first fluid inlet, a second fluid inlet, a liquid outlet and a vapor outlet, where the first fluid inlet configured to receive a fluid stream from the liquid outlet of the scrubbing section. A stripping gas feed expansion device has an inlet configured to receive a portion of the expanded feed gas stream with the stripping gas feed expansion device having an outlet in fluid communication with the second fluid inlet of the stripping section. A side draw vapor line is configured to receive a vapor stream from the vapor outlet of the stripping section, where the side draw vapor line in fluid communication with the reflux stream cooling passage of the heavies removal heat exchanger. A reflux separation device is configured to receive fluid from the reflux cooling stream passage of the heavies removal heat exchanger, where the reflux separation device includes a liquid outlet and a vapor outlet and wherein the liquid outlet of the reflux separation device is in fluid communication with the reflux inlet of the scrubbing section. A return vapor expansion device has an inlet configured to receive a vapor stream from the return vapor outlet of the scrubbing section and an outlet configured to direct a cooled vapor stream to the return vapor stream warming passage of the heavies removal heat exchanger. A feed gas compressor has an inlet configured to receive a fluid from the return vapor stream warming passage of the heavies removal heat exchanger and an outlet. The reflux separation device vapor outlet is also in fluid communication with the inlet of the feed gas compressor.

In another aspect, a process for removing heavy hydrocarbon components from a feed gas stream includes the steps of: expanding the feed gas stream; splitting the expanded feed gas stream into a main feed stream that includes a majority portion of the expanded feed gas stream and a stripping gas feed stream; cooling the main feed stream in a heavies removal heat exchanger; directing the cooled main feed stream to a scrubbing section; separating the cooled main feed stream into a main stream vapor portion and a main stream liquid portion in the scrubbing section; expanding the stripping gas feed stream; directing the expanded stripping gas feed stream to a stripping section; separating the stripping gas feed stream into a stripping vapor portion and a stripping liquid portion in the stripping section; expanding the main stream liquid portion to create a main mixed phase stream; directing the main mixed phase stream to the stripping section; cooling the stripping vapor portion to create a reflux mixed phase stream; separating the reflux mixed phase stream into a reflux vapor portion and a reflux liquid portion; directing the reflux liquid portion to the scrubbing section; expanding the main stream vapor portion; warming the expanded main stream vapor portion in the heavies removal heat exchanger to cool the main feed stream; expanding the reflux vapor portion; warming the expanded reflux vapor portion in the heavies removal heat exchanger to cool the main feed stream; compressing the warmed expanded main stream vapor portion and the warmed expanded reflux vapor portion.

BRIEF DESCRIPTION OF THE DRAWINGS

FIG. 12 is a process flow diagram and schematic illustrating a twelfth embodiment of the heavy hydrocarbon removal system and method of the disclosure;

FIG. 13 is a process flow diagram and schematic illustrating a thirteen embodiment of the heavy hydrocarbon removal system and method of the disclosure;

DETAILED DESCRIPTION OF EMBODIMENTS

Embodiments of a heavy hydrocarbon removal system in accordance with the disclosure are illustrated in FIGS. 1-19. It should be noted that while the embodiments are illustrated and described below in terms of removing heavy hydrocarbons components from a natural gas feed stream prior to being liquefied, the technology of the disclosure may be used to remove other components from alternative gas feed streams prior to alternative types of downstream processing.

It should also be noted that in the descriptions presented below, the lines or passages and streams are sometimes both referred to by the same reference numbers set out in the figures.

Figure 1:
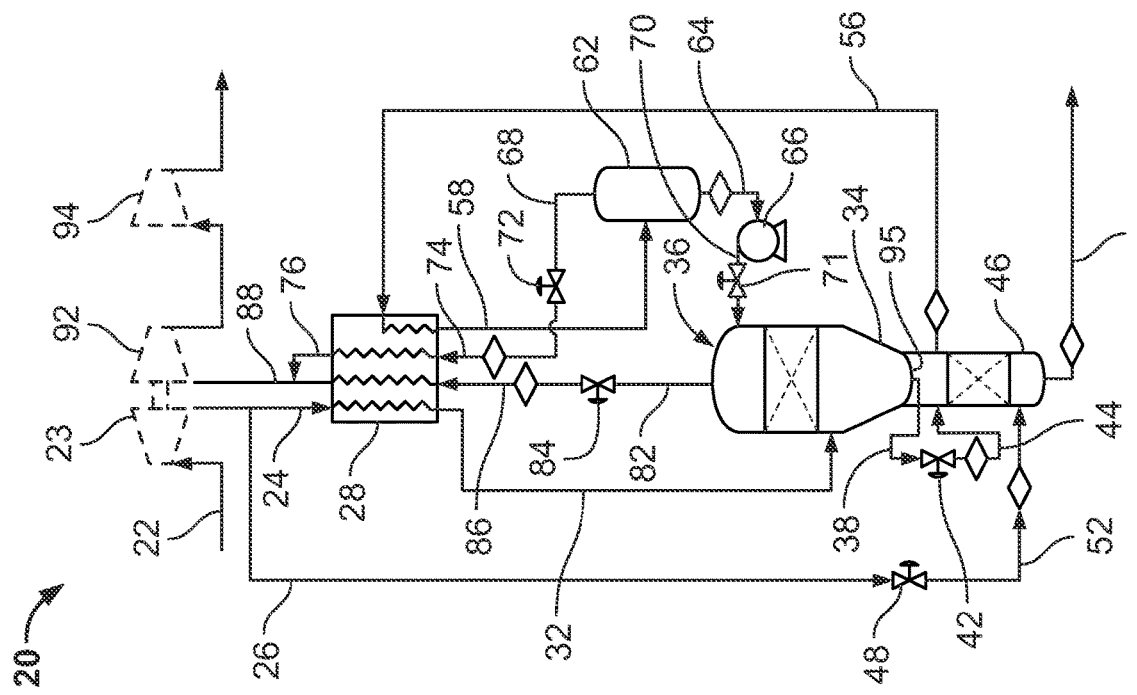
FIG. 1 is a process flow diagram and schematic illustrating a first embodiment of the heavy hydrocarbon removal system and method of the disclosure.

With reference to FIG. 1, a first embodiment of the system of the disclosure is indicated in general at 20. A hydrocarbon feed gas stream 22 (such as a natural gas stream) enters a feed gas expander turbine 23 and the resulting expanded gas stream is split into a main feed stream 24 and a stripping gas feed stream 26.

The main feed stream 24, which contains the bulk of the feed gas stream 22, passes through a heavies removal heat exchanger 28 and is cooled and partially condensed. The resulting mixed phase stream 32 is then routed to a scrubbing section 34 of a heavies removal column, indicated in general at 36, where liquids are separated from the main feed vapor. The resulting liquid stream 38, which contains a large portion of the feed gas heavy hydrocarbon/freezing components is directed to an optional expansion device 42 (such as a Joule-Thomson or JT valve) with the resulting mixed phase stream 44 traveling to the upper portion of the column stripping section 46. As used herein, the term "expansion device" includes, but is not limited to, a JT valve, rotating expander, turbine, orifice plate and any other expansion device known in the art. Stream 44 is separated into a vapor portion and a liquid portion upon entering the column stripping section 46.

The stripping gas feed stream 26 travels to an expansion device 48 (such as a Joule-Thomson or JT valve) with the resulting mixed phase stream 52 traveling to the lower portion of the column stripping section 46. The vapor portion of stream 52 is separated from the liquid portion upon entering the stripping column section 46 and rises to provide heating action to the liquids from stream 44 coming down through the stripping section internals thereby revaporizing a portion of the lighter components in said liquids. The liquid portion of stream 52 exits the stripping section 46 as a portion of natural gas liquids (NGL) condensate stream 54 as does the remaining liquid portion of the stream 44. Condensate stream 54 contains a majority of the heavy hydrocarbon/freezing components that were present in the feed gas stream 22.

A vapor side draw stream 56 exits the stripping section 46 of the heavies removal column and is cooled and partially condensed in the heavies removal exchanger 28. A resulting mixed phase stream 58 travels to a separation device, such as a heavies removal reflux drum 62, and is separated into vapor and liquid portions. The liquid stream 64 from the separation device 62 is routed via pump 66 (optional) to the top of the heavies removal column scrubbing section 34 as reflux stream 70 after passing through optional control valve 71.

The vapor stream 68 from the separation device 62 is routed across an expansion device 72 (such as a JT valve) where it is cooled to form cooled stream 74, a portion (or all) of which passes through the heavies removal exchanger 28 and is warmed and thereby provides cooling to other streams in the exchanger. Vapor stream 76 is provided as a result.

The vapor portion of the mixed phase stream 32 in the heavies removal column scrubbing section undergoes mass transfer with the reflux provided by reflux stream 70 within the column scrubbing section internals, which may be trays, random packing, or structured packing. This removes freezing components/heavy hydrocarbons from the vapor portion of the main feed stream 32. The scrubbed return vapor stream 82 exits the top of the column 36 and is then routed across an expansion device 84 (such as a JT valve) to produce cooling. The cooled return vapor stream 86 is then routed to the heavies removal exchanger 28 where it is warmed in one or more passages and thereby, along with stream 74, provides cooling to other streams in the exchanger. After warming and combination with stream 76, the return vapor stream 88 is compressed by feed gas compressor 92 and sent to a liquefaction process so that a liquefied stream (such a liquid natural gas/LNG) is produced.

The feed gas compressor 92 is preferably powered by the feed gas expander turbine 23, while a booster compressor 94 (which may or may not be powered by the gas expander turbine 23) may optionally also be provided. By expanding the feed gas stream 22 prior to cooling, greater power is developed by the turbine 23, which results in greater power being available to run the compressor 92 (and any booster compressors). This decreases net power usage of the system and thus increases system efficiency in some applications. Furthermore, expanding the feed gas stream 22 prior to cooling lowers equipment cost as, in some applications, carbon steel may be used to construct the feed gas turbine 23 (as opposed to stainless steel, which is required for expanding at colder fluid temperatures).

As examples only, the systems described herein may provide purified gas to the liquefaction processes and systems described in commonly owned U.S. Pat. No. 9,411,877 to Gushanas et al., U.S. Pat. No. 10,480,851 to Ducote et al. or U.S. Pat. No. 10,663,221 to Ducote et al., the contents of each of which are hereby incorporated by reference.

Figure 2:
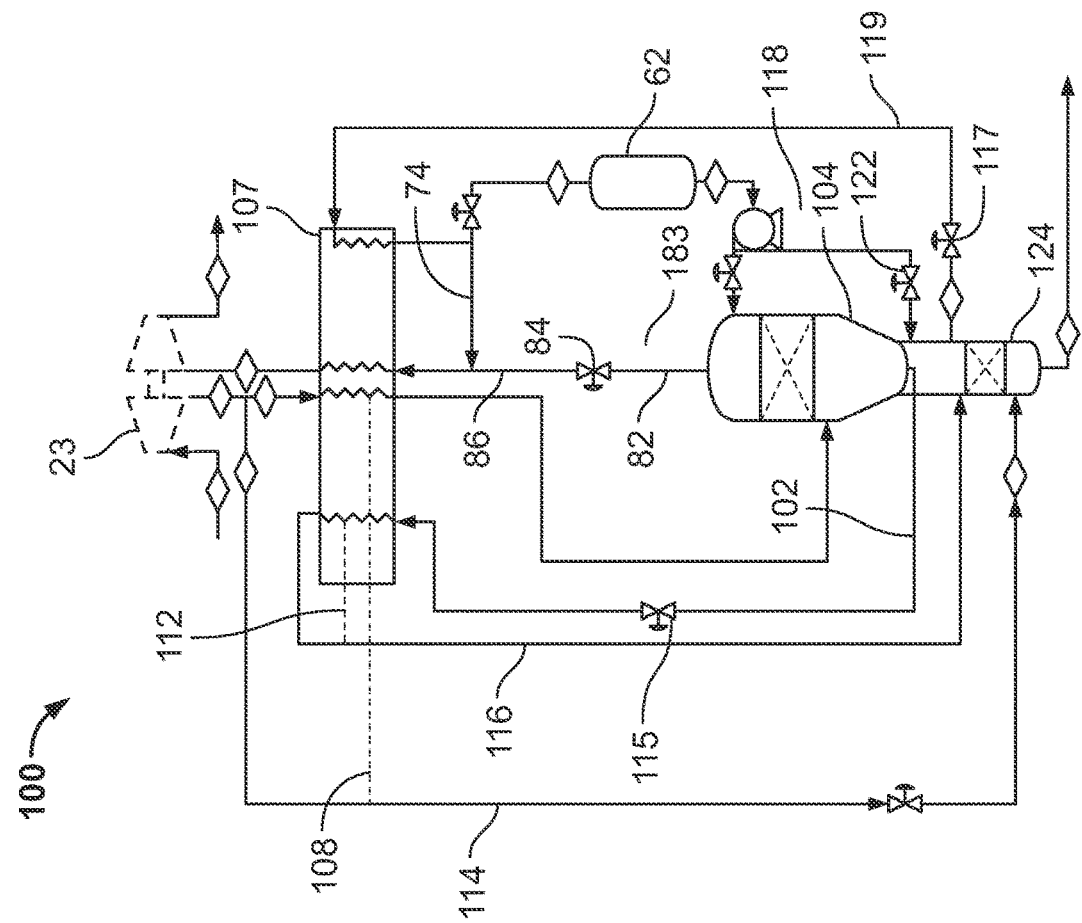
FIG. 2 is a process flow diagram and schematic illustrating a second embodiment of the heavy hydrocarbon removal system and method of the disclosure.

It should be noted that, in alternative embodiments, streams 74 and 86 may be combined prior to introduction into the heat exchanger 28, as illustrated in FIG. 2. Furthermore, the vessel head 95 (FIG. 1) separating the scrubbing and stripping sections of column 36 may optionally be removed so that the functions are combined into a single column with trap-out trays or other devices used to capture liquid. In other alternative embodiments, the scrubbing and stripping sections may be provided as entirely separate individual columns.

Advantages of the embodiment of FIG. 1 include the expander 23 both extracting power and providing cooling to the feed gas stream. In addition, the side draw reflux stream provides high recovery of heavy hydrocarbons, including captures of Benzene, Toluene, Ethylbenzene, Xylenes (BTEX).

In a second embodiment of the system of the disclosure, indicated in general at 100 in FIG. 2, a reboiler service has been added to the system of FIG. 1 whereby the liquid stream 102 from the scrubbing section 104, after being expanded and cooled in optional reboiler expansion device 115, such as a JT valve, is warmed in the heavies removal exchanger 107 to provide cooling therein. In an alternative embodiment, a portion of stream 102 may go directly to the stripping section either before or after passing through expansion device 115. An expansion device 117 has also been added to vapor side draw stream 119 to cool the vapor from the stripping section prior to travel to the heavies removal exchanger 107. In addition, optional streams 108 and 112 from the exchanger may be used to optimize the temperatures of the stripping gas stream 114 and reboiler return stream 116, respectively. Furthermore, line 118 may optionally be provided (either with or without control valve 122) to provide injection of side draw reflux to the stripping section 124. In an alternative embodiment, a branch 83 may direct a portion of the scrubbed return vapor stream 82 to the separation device (reflux drum) 62. The remaining components of the system of FIG. 2 may generally be the same and provide the same functionality as those illustrated in FIG. 1.

Figure 3:
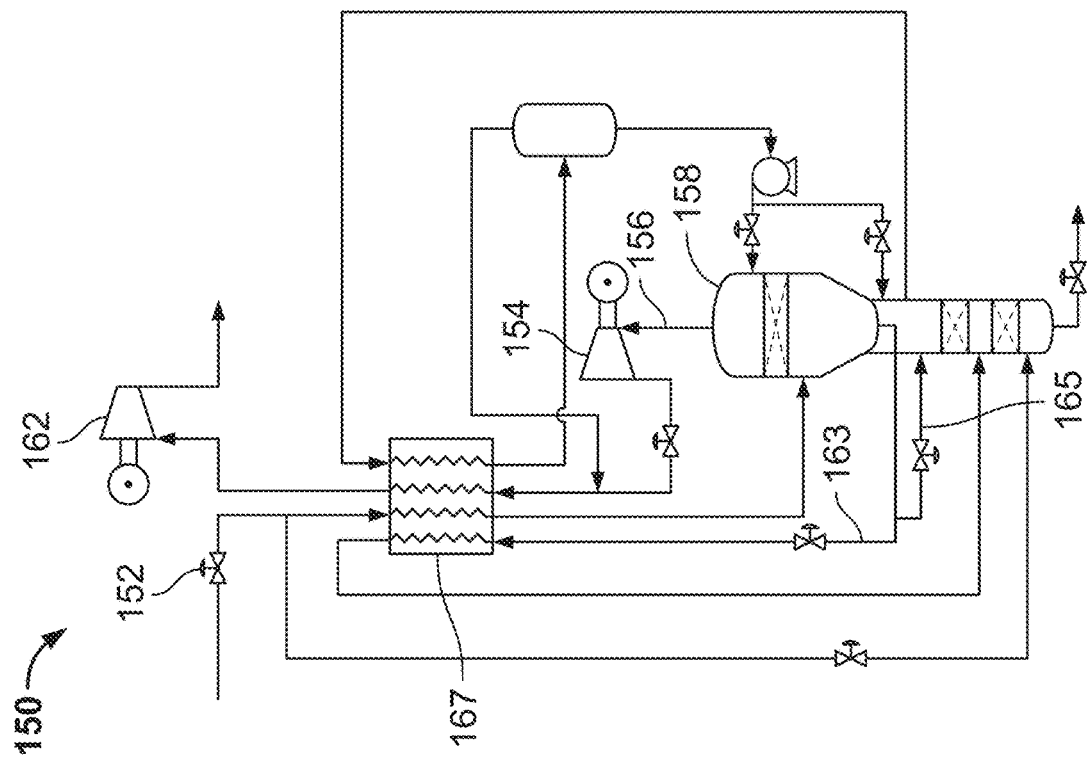
FIG. 3 is a process flow diagram and schematic illustrating a third embodiment of the heavy hydrocarbon removal system and method of the disclosure.

In a third embodiment of the system of the disclosure, indicated in general at 150, in FIG. 3, an expansion device 152, such as a JT valve, is substituted for the feed gas expander turbine 24 of the systems of FIGS. 1 and 2. System 150 of FIG. 3 also substitutes a return vapor expander turbine 154 for the JT valve 84 of systems 20 and 100 of FIGS. 1 and 2 that receives the return vapor stream 156 from the heavies removal column 158. This return vapor expander turbine 154 preferably powers the feed gas compressor 162. The remaining components of the system of FIG. 2 may generally be the same and provide the same functionality as those illustrated in FIG. 1. In an alternative version of the system of the disclosure, as illustrated in FIG. 3, a portion 163 of the scrubber liquid stream goes through the scrubber liquid reheat passage of the heavies removal heat exchanger 167 and a remaining portion 165 of the scrubber liquid stream goes directly to the stripping section.

Figure 4:
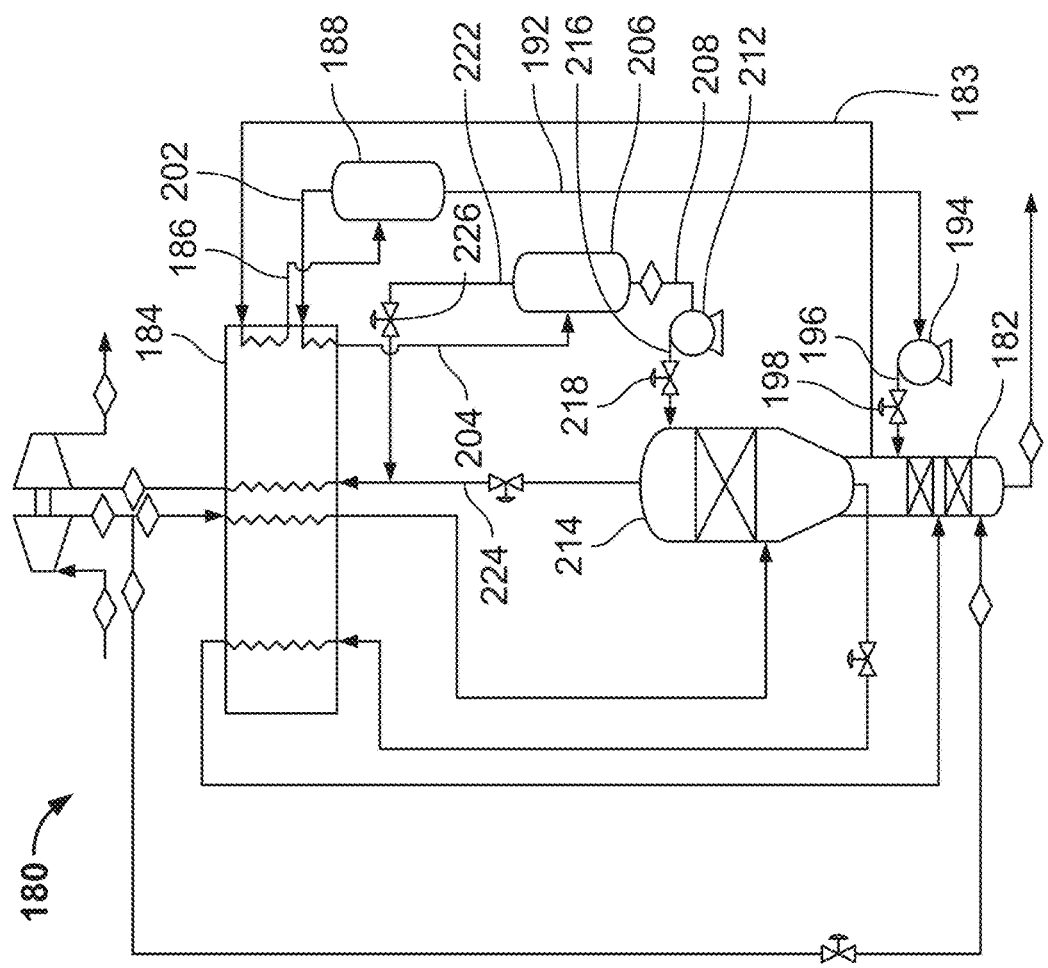
FIG. 4 is a process flow diagram and schematic illustrating a fourth embodiment of the heavy hydrocarbon removal system and method of the disclosure.

In a fourth embodiment of the system of the disclosure, indicated in general at 180 in FIG. 4, a cascade side draw reflux arrangement has been added to the system of FIG. 2. More specifically, a vapor side draw stream 183 exits the stripping section 182 of the heavies removal column and is cooled and partially condensed in the heavies removal exchanger 184. A resulting mixed phase stream 186 travels to a first reflux separation device, such as a warm reflux drum 188, and is separated into vapor and liquid portions. The liquid stream 192 from the warm reflux drum 188 is routed via pump 194 (optional) to the top of the stripping section 182 of the heavies removal column as reflux stream 196 after passing through optional expansion device 198.

With continued reference to FIG. 4, the vapor stream 202 from the warm reflux drum 188 travels to heavies removal exchanger 184 and is cooled and partially condensed. A resulting mixed phase stream 204 travels to a second reflux separation device, such as cold reflux drum 206, and is separated into vapor and liquid portions. The liquid stream 208 from the separation device 206 is routed via pump 212 (optional) to the top of the heavies removal column scrubbing section 214 as reflux stream 216 after passing through optional control valve 218. Vapor stream 222 exits the top of cold reflux drum 206 and joins return vapor stream 224 after passing through expansion device 226. While a single packing section for the scrubbing section 214 is illustrated in FIG. 4, the scrubbing section may optionally be provided with two (or more) packing sections based on design considerations.

The remaining components of the system of FIG. 4 may generally be the same and provide the same functionality as those illustrated in FIGS. 1 and 2.

The cascade reflux arrangement of FIG. 4 lowers the level of heavy hydrocarbon components present in the reflux streams (as compared to the systems of FIGS. 1-3) in some applications.

Figure 5:
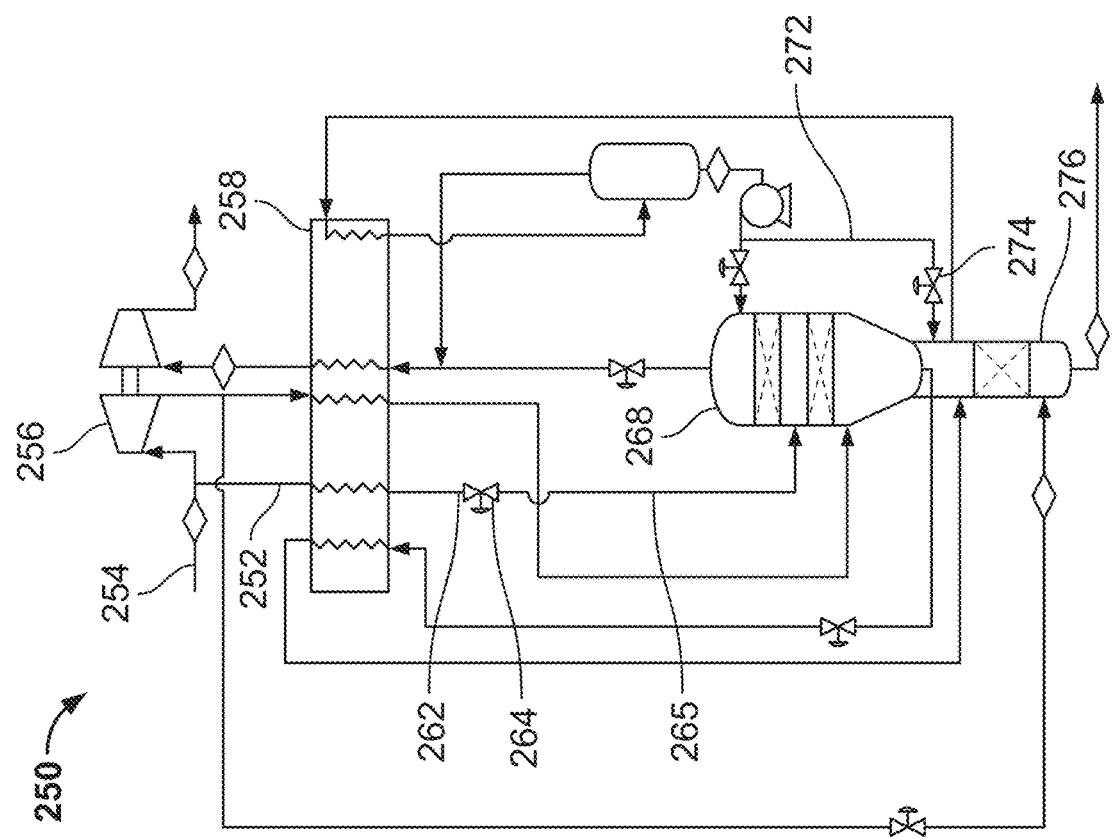
FIG. 5 is a process flow diagram and schematic illustrating a fifth embodiment of the heavy hydrocarbon removal system and method of the disclosure.

In a fifth embodiment of the system of the disclosure, indicated in general at 250 in FIG. 5, a split feed reflux arrangement has been added to the system 100 of FIG. 2. More specifically, the system 250 includes a branch off of the hydrocarbon feed gas stream 254 before the feed gas expander 256. A small portion of the feed gas stream splits off at the branch and flows through line 252 as a split feed reflux gas stream that is cooled in the heavies removal exchanger 258 and at least partially condensed to form mixed phase stream 262. This stream is then expanded via a split feed reflux expansion device 264, such as a JT valve, with the resulting cooled stream 266 directed to the scrubbing section 268 of the heavies removal column as reflux to aid in the removal of heavy hydrocarbons from the column main feed. Such a system provides improved efficiency for some high pressure feed gas applications. The scrub section can be single or double packed and the stream 266 may enter the scrub section above the packing or at a mid-point between the two packing sections.

In an alternative embodiment, the expansion device 264 of FIG. 5 may be omitted. In a further alternative embodiment, line 272 may optionally be provided (either with or without control valve 274) to provide injection of side draw reflux to the stripping section 276.

The remaining components of the system of FIG. 5 may generally be the same and provide the same functionality as those illustrated in FIGS. 1 and 2.

Figure 6:
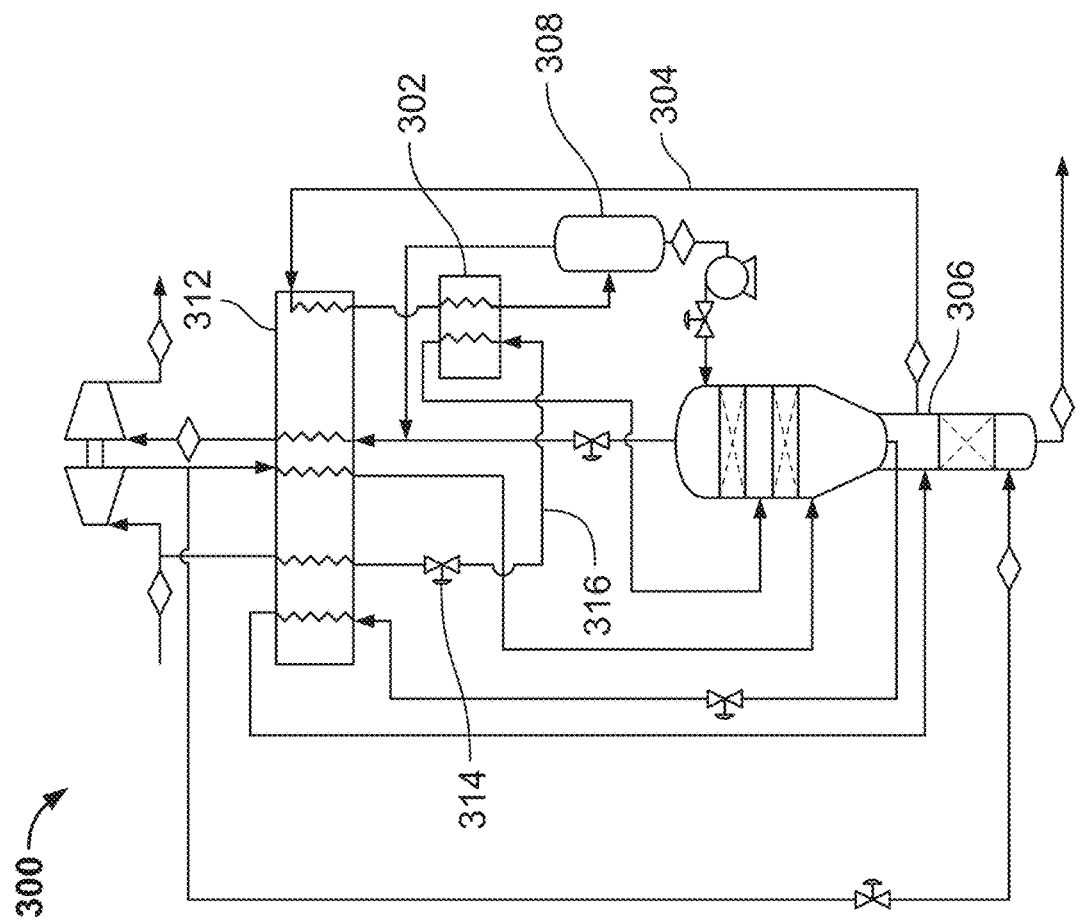
FIG. 6 is a process flow diagram and schematic illustrating a sixth embodiment of the heavy hydrocarbon removal system and method of the disclosure.

In a sixth embodiment of the system of the disclosure, indicated in general at 300 in FIG. 6, a reflux heat exchanger 302 has been added to the system of FIG. 5 to provide additional cooling to the vapor side draw 304 from the stripping section 306 of the column prior to the reflux drum 308. The cooling in supplemental reflux heat exchanger 302 is provided by the cooled (via heavies removal heat exchanger 312) and expanded (via expansion device 314) split feed reflux stream 316. The remaining components of the system of FIG. 6 may generally be the same and provide the same functionality as those illustrated in FIGS. 1-5.

The additional heat exchanger 302 allows for cooler reflux and provide more efficient removal of heavy hydrocarbons in some applications. It should be noted that the heat exchangers 312 and 302 may be combined into a single heat exchanger in alternative embodiments.

Figure 7:
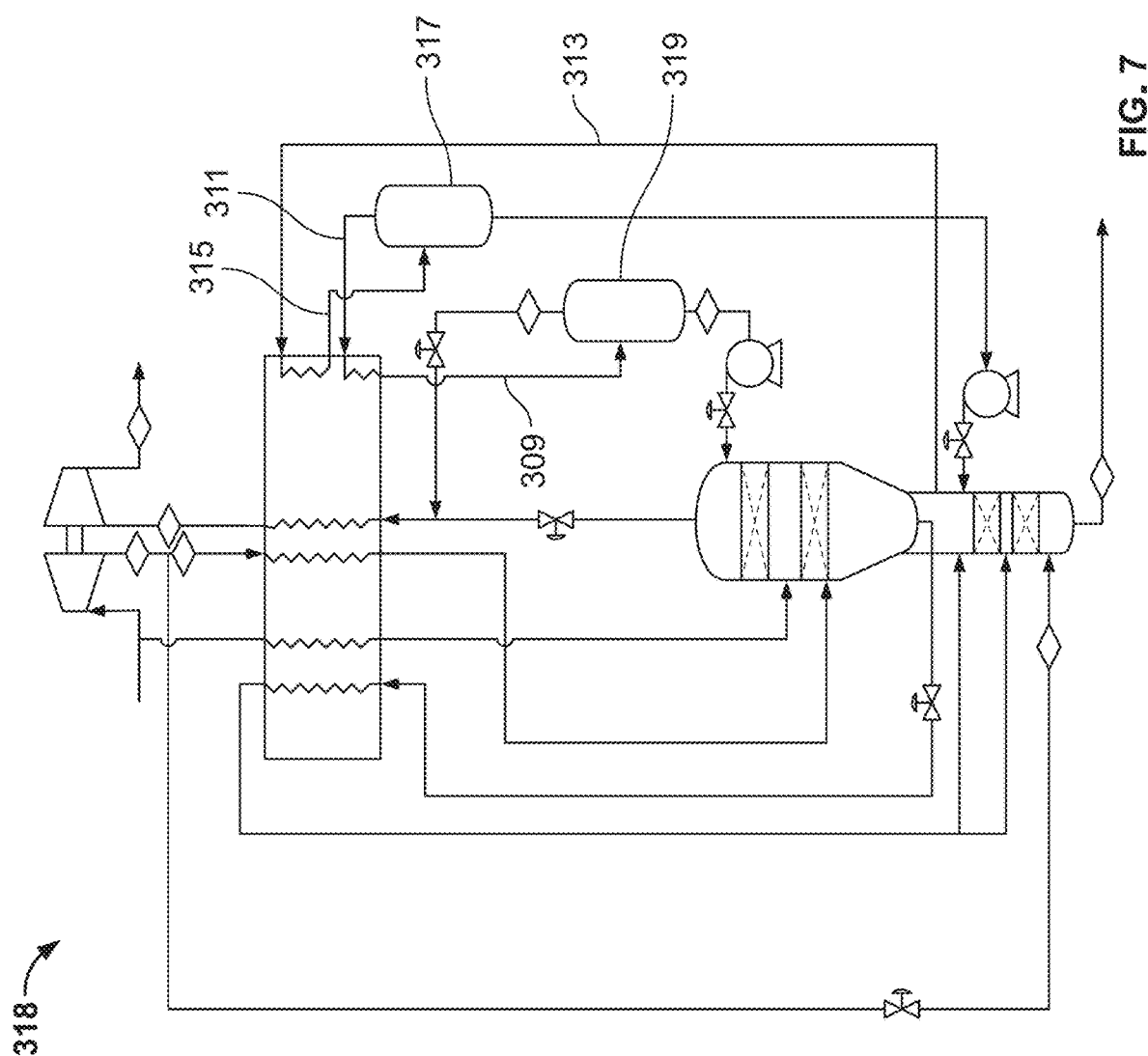
FIG. 7 is a process flow diagram and schematic illustrating a seventh embodiment of the heavy hydrocarbon removal system and method of the disclosure.

In a seventh embodiment of the system of the disclosure, indicated in general at 318 in FIG. 7, the cascade side draw reflux arrangement of FIG. 4 may be added to the system of FIG. 5. As a result, the system 318 of FIG. 7 includes a first reflux separation device, such as a warm reflux drum 317, which receives and separates a mixed phase stream 315 (resulting from cooling of side draw vapor stream 313) into liquid and vapor portions. The vapor portion 311 is cooled and the resulting mixed phase stream 309 is provided to a second reflux separation device, such as cold reflux drum 319, and is separated into vapor and liquid portions, which are further processed as explained with reference to FIG. 4.

Figure 8:
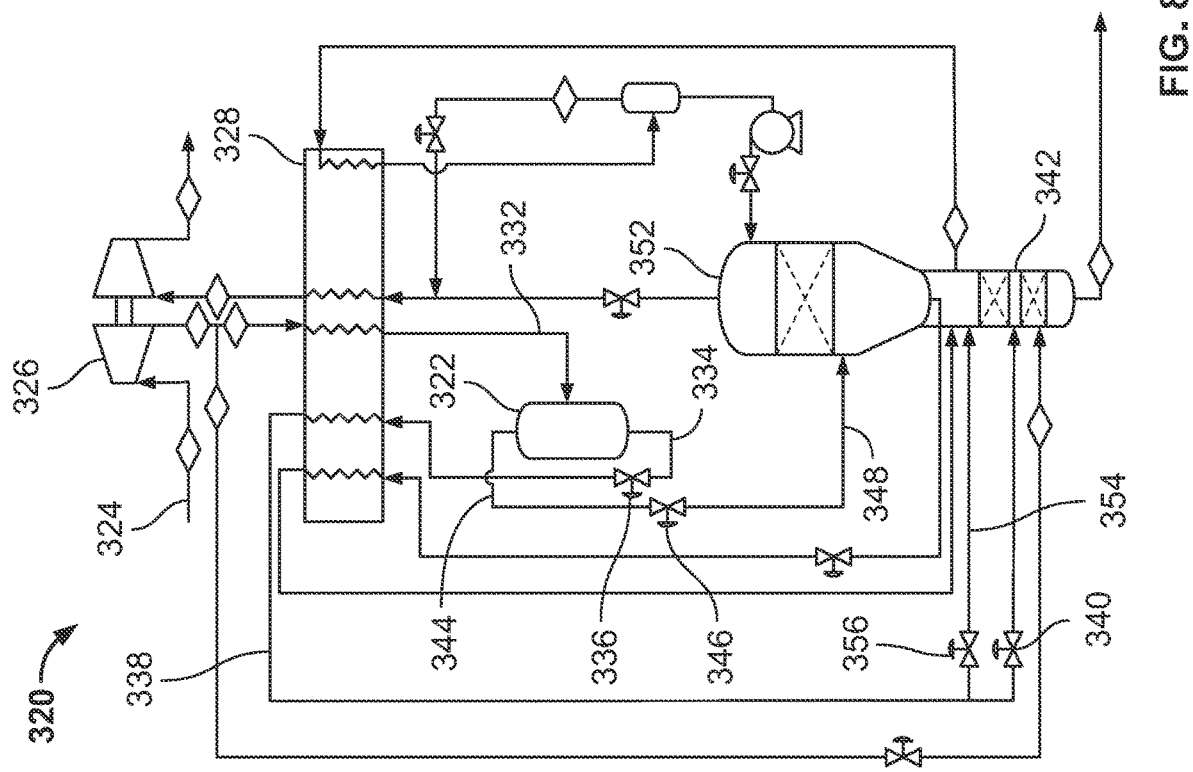
FIG. 8 is a process flow diagram and schematic illustrating an eighth embodiment of the heavy hydrocarbon removal system and method of the disclosure.

In an eighth embodiment of the system of the disclosure, indicated in general at 320 in FIG. 8, a feed separation device 322 has been added to the system of FIG. 2. As in previous embodiments, the feed gas stream 324 is expanded by feed gas expander 326 and then cooled by the heavies removal heat exchanger 328. The resulting mixed phase stream 332 is directed to the feed separation device 322 where it is separated into a vapor portion and a liquid portion. The liquid portion exits the feed separation device 322 as liquid stream 334 and, after expansion via separated feed liquid expansion device 336 (such as a JT valve) is warmed in the heavies removal heat exchanger to provide refrigeration therein. The resulting mixed phase stream 338, which may pass through optional cooled separated feed liquid expansion device 340, such as a JT valve, is directed to the stripping section 342 of the heavies removal column .where it is separated into vapor and liquid portions.

The vapor stream 344 from the feed separation device 322 is directed through (optional) separated feed vapor expansion device 346, such as a JT valve, where it is cooled and partially condensed so that mixed phase stream 348 is formed. Mixed phase stream 348 is then directed to the scrubbing section 352 of the heavies removal column where it is separated into vapor and liquid portions. Such a system provides improved efficiency at moderate pressure for some applications and may also be beneficial for richer feed gas applications.

The remaining components of the system of FIG. 7 may generally be the same and provide the same functionality as those illustrated in FIGS. 1 and 2.

The system 320 of FIG. 8 may include an optional branch 354 to the stripping section 342 from the mixed phase stream 338. Branch 354 may optionally include an expansion device 356, such as a JT valve. Such an arrangement may be desirable when additional flow is required at the top of the stripping section to meet wetting criteria. In such an embodiment, the stripping section 342 has two layers of internal trays or the like to allow for the additional injection location higher in the stripping section.

The embodiment of FIG. 8 provides improved efficiency at moderate feed pressures and/or when the feed gas stream 324 is rich in some applications.

Figure 9:
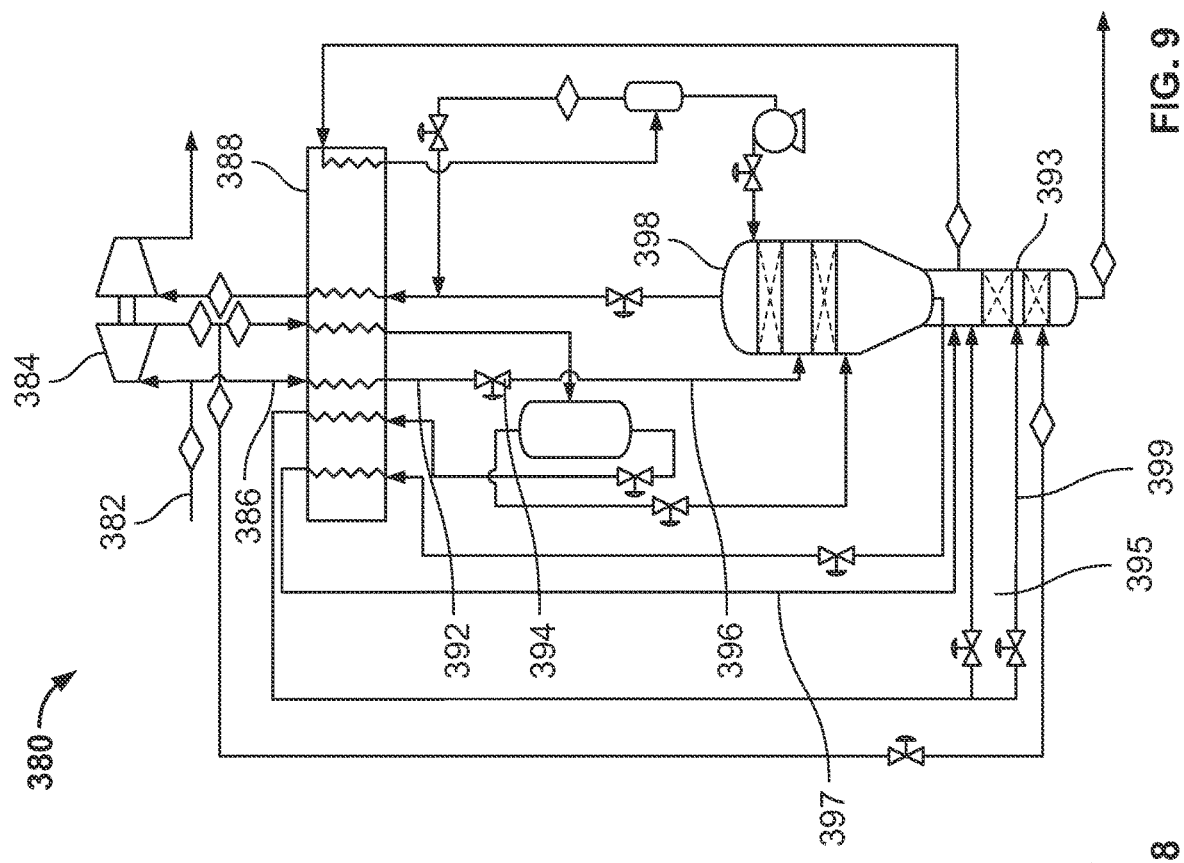
FIG. 9 is a process flow diagram and schematic illustrating a nineth embodiment of the heavy hydrocarbon removal system and method of the disclosure.

In a ninth embodiment of the system of the disclosure, indicated in general at 380 in FIG. 9, a split feed reflux arrangement has been added to the system 320 of FIG. 8. More specifically, the system 380 includes a branch off of the hydrocarbon feed gas stream 382 before the feed gas expander 384. A small portion of the feed gas stream splits off at the branch and flows through line 386 as a split feed reflux gas stream that is cooled in the heavies removal exchanger 388 and at least partially condensed to form mixed phase stream 392. This stream is then expanded via an expansion device 394, such as a JT valve, with the resulting cooled stream 396 directed to the scrubbing section 398 of the heavies removal column as reflux to aid in the removal of heavy hydrocarbons from the column main feed. In an alternative embodiment, expansion device 394 may be omitted. In a further embodiment, a branch 395 may be added to the line 397 leading from the heavies removal heat exchanger 388 so that a portion of the mixed phase stream in line 397 may be transferred to line 399, which also enters the stripping section 393 of the heavies removal column.

Figure 10:
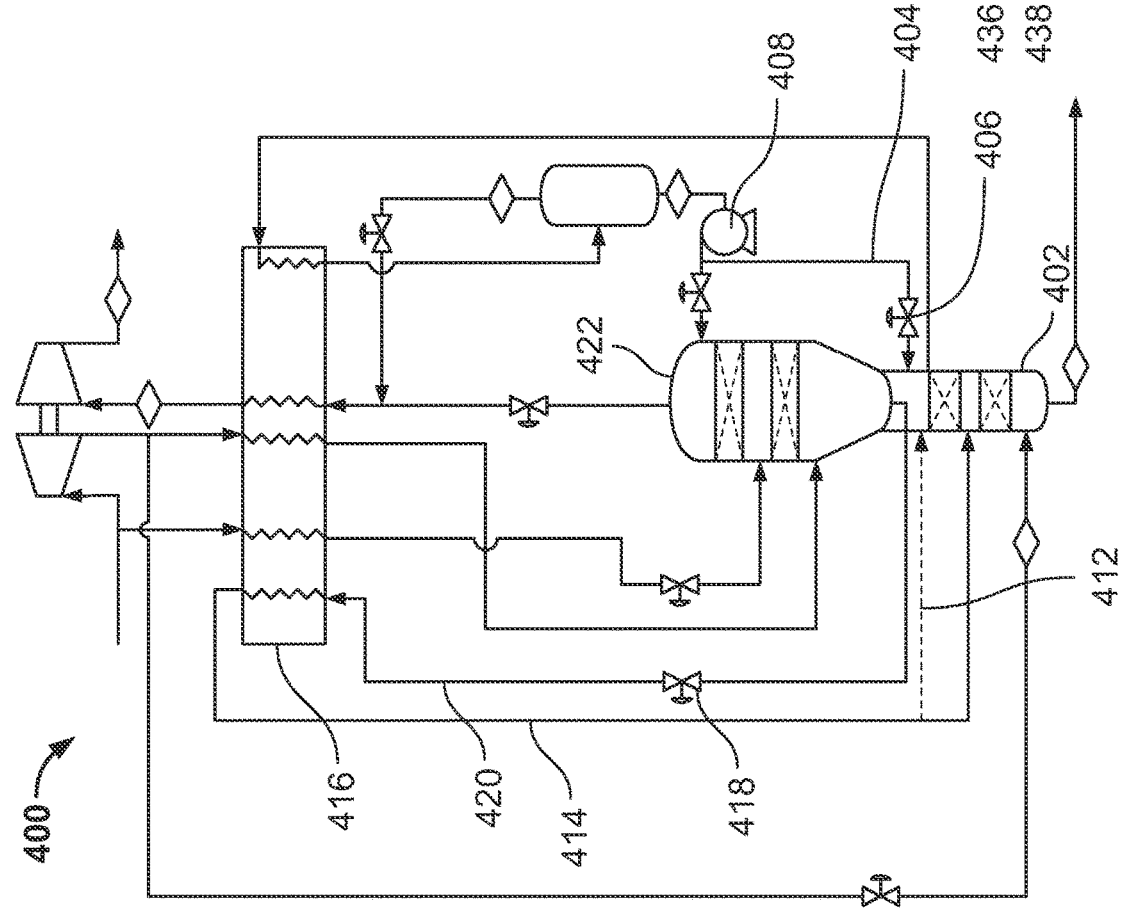
FIG. 10 is a process flow diagram and schematic illustrating a tenth embodiment of the heavy hydrocarbon removal system and method of the disclosure.

In a tenth embodiment of the system of the disclosure, indicated in general at 400 in FIG. 10, a cold reflux stream is provided to the stripping section 402 of the heavies removal column. More specifically, as described previously for the systems of FIGS. 2 and 5, split reflux line 404 may be provided (either with or without control valve 406) after reflux pump 408 to provide injection of side draw reflux to the stripping section 402. Such a split of the side draw reflux provides additional efficiency in the removal of heavy hydrocarbons in some applications. The split reflux also lowers BTEX and enhances control of reflux BTEX concentration in the reflux stream and thus lowers BTEX in the clean gas exiting the top of the heavies removal column in some applications. As a result, the system 400 is suitable for applications having high BTEX levels in the feed gas stream.

In addition, as illustrated in FIG. 10, the system 400 may include an optional branch 412 to the stripping section 402 from the reboiler line 414 that leads from the heavies removal heat exchanger 416. Such an arrangement may be desirable when additional flow is required at the top of the stripping section to meet wetting criteria. In such an embodiment, the stripping section 402 has two layers of internal trays or the like to allow for the additional injection location higher in the stripping section.

Figure 11:
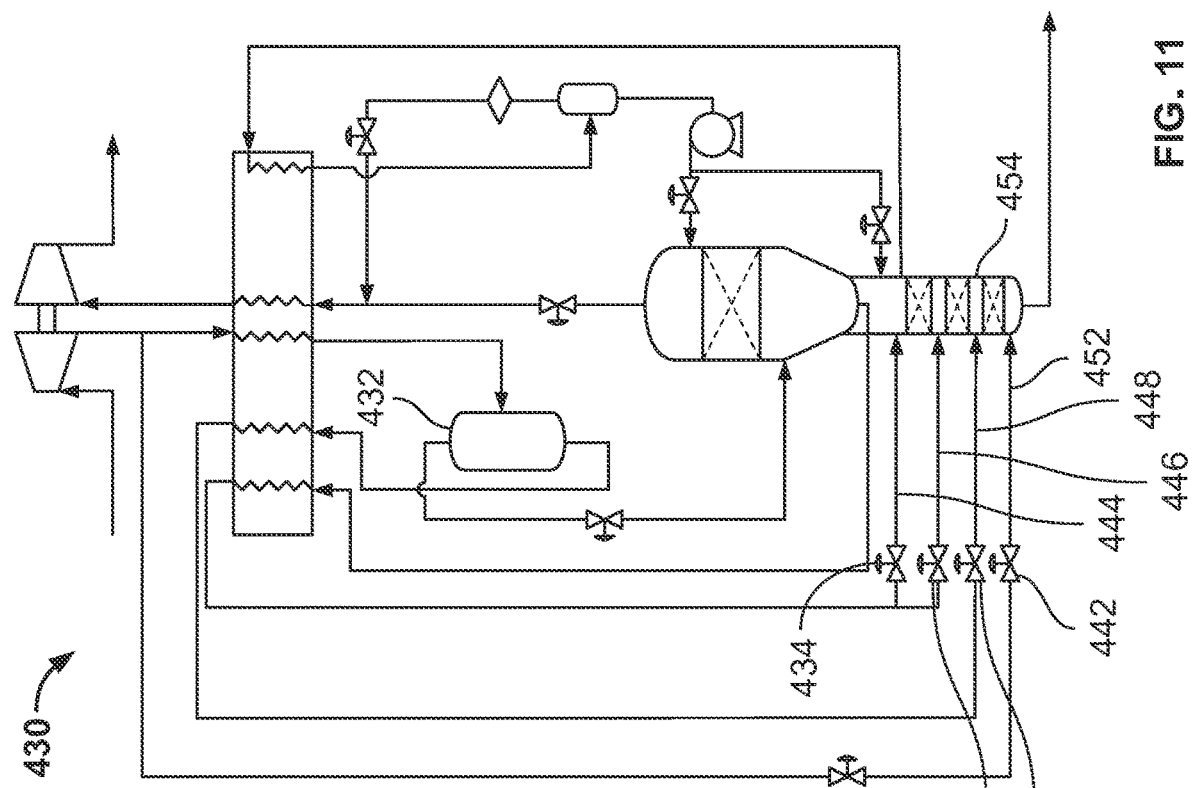
FIG. 11 is a process flow diagram and schematic illustrating an eleventh embodiment of the heavy hydrocarbon removal system and method of the disclosure.

As illustrated by system 430 of FIG. 11 at 432, the feed separation device of FIG. 7 (322 in FIG. 7) may be added to the system of FIG. 9. The system of FIG. 11 also illustrates that the system of 400 of FIG. 10 may be modified to omit the expansion device 418 present in the liquid line 420 leading from the scrubbing section 422 of the heavies removal column to the heavies removal heat exchanger 416. In the system 430 of FIG. 11, expansion devices, such as JT valves 434, 436, 438 and 442, have been added to the lines 444, 446, 448 and 452, respectively, leading to the scrubbing section 454 of the heavies removal column, with the scrubbing section including multiple layers of internal trays of the like to accommodate the multiple injection locations.

As illustrated by system 500 of FIG. 12, the system of FIG. 10 may be modified to add a side draw expansion device, such as JT valve 502, to the side draw vapor line 504 exiting stripping section 506. Furthermore, as described previously with respect to FIG. 2, a branch 507 may direct a portion of the scrubbed return vapor stream 508 from the heavies removal column 509 to the separation device (reflux drum) 512 prior to expansion device 514. In an alternative embodiment, the expansion device 514 and corresponding line portion 516 may be omitted so that all of the scrubbed return vapor stream 508 is directed to reflux drum 512. The vapor stream 518 from the reflux drum is then directed to through, and warmed within, the heavies removal heat exchanger 522 after passing through and being cooled in an expansion device, such as JT valve 524.

Figure 14:
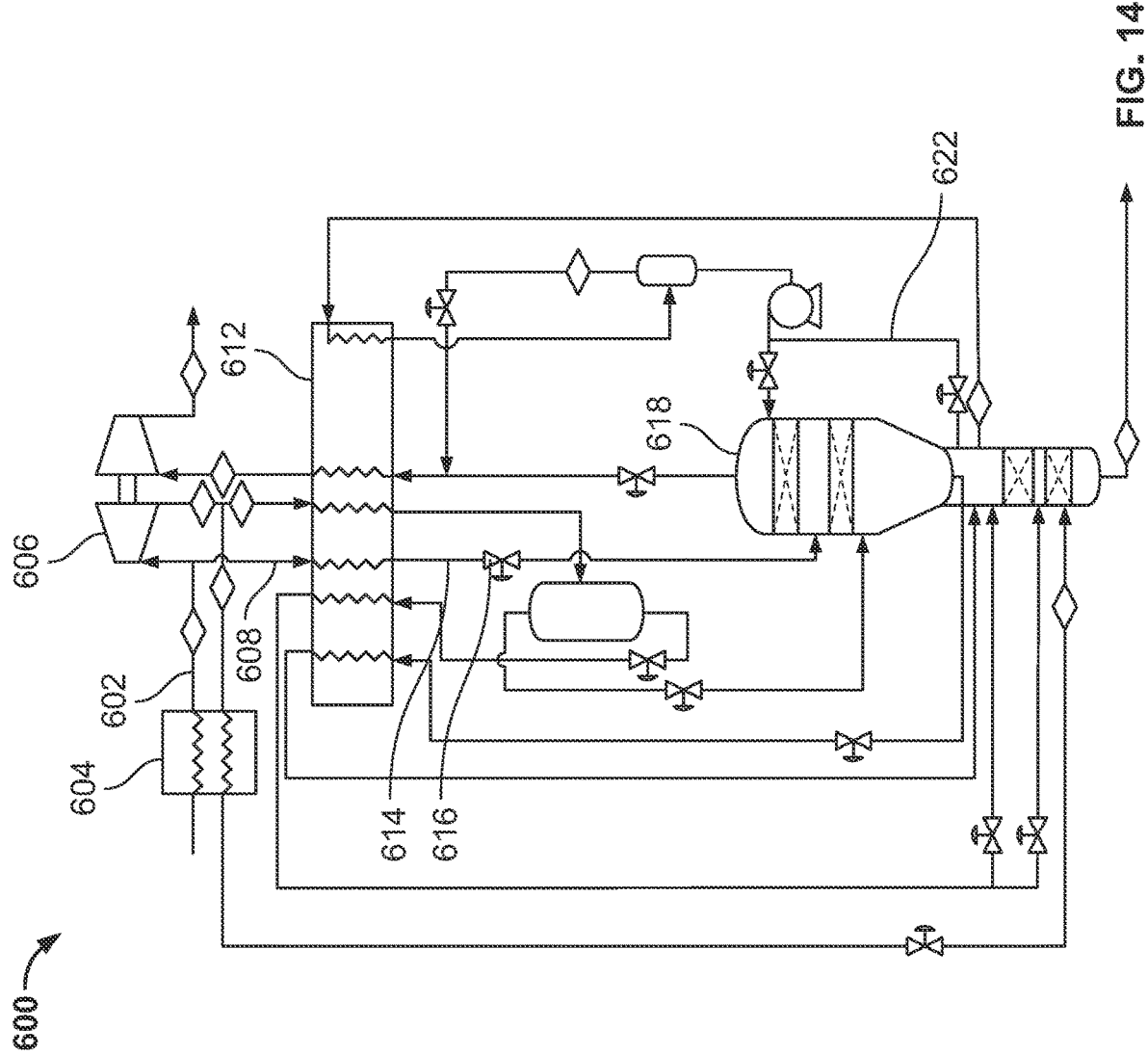
FIG. 14 is a process flow diagram and schematic illustrating a fourteenth embodiment of the heavy hydrocarbon removal system and method of the disclosure.
Figure 15:
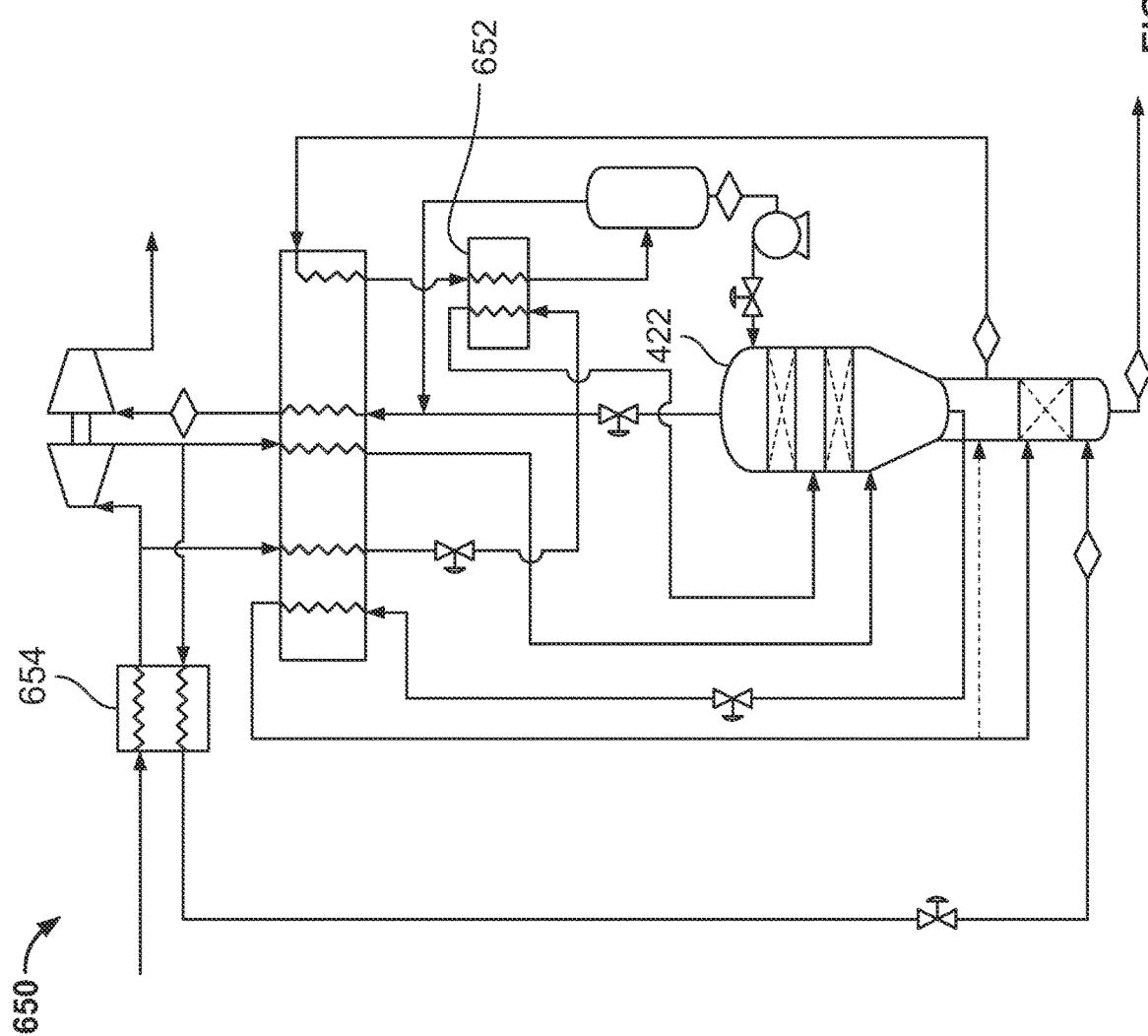
FIG. 15 is a process flow diagram and schematic illustrating a fifteenth embodiment of the heavy hydrocarbon removal system and method of the disclosure.

In the embodiments of FIGS. 13-15, optimization of the stripping gas temperature is obtained in some applications to provide improved control for tighter natural gas liquids (NGL) specifications.

In the system indicated in general at 550 in FIG. 13, a feed gas heat exchanger 552 receives the feed gas stream 554. A cooled feed gas stream 556 exits the feed gas heat exchanger and is expanded and cooled within feed gas expander turbine 558. The stream exiting the turbine is split to form main stream 562, which contains the majority of the feed gas stream, and stripping gas stream 564. Stripping gas stream 564 travels through the feed gas heat exchanger 552 and is warmed so that refrigeration is provided to cool feed gas stream 554. The warmed stripping gas stream 566 exits the feed gas heat exchanger 552 and is expanded in an optional expansion device, such as JT valve 568, and directed to the stripping section 572. Such an arrangement optimizes the temperature of the stripping gas in some applications to meet some specifications for NGL condensate stream 574. For example, the warmer stripping gas lowers the levels of methane present in the NGL condensate stream 574. Alternative options for warming the stripping gas stream include using heating mediums other than fluids and different types of heat exchangers, including braised aluminum heat exchangers, plate-frame heat exchangers and shell & tube heat exchangers.

As illustrated by system 600 in FIG. 14, the split feed reflux arrangement of FIG. 5 may added to the system 550 of FIG. 13. More specifically, the system 600 includes a branch off of the cooled hydrocarbon feed gas stream 602 downstream of the feed gas heat exchanger 604 before the feed gas expander 606. As in the embodiment of FIG. 5, a small portion of the feed gas stream splits off at the branch and flows through line 608 as a split feed reflux gas stream that is cooled in the heavies removal exchanger 612 and at least partially condensed to form mixed phase stream 614. This stream is then expanded via optional expansion device 616, such as a JT valve, with the resulting cooled stream directed to the scrubbing section 618 of the heavies removal column as reflux.

In addition, the cold reflux stream 622 of the systems of FIGS. 2, 5 and 10 may optionally be added to the system 600 of FIG. 14.

As illustrated by the system 650 of FIG. 15, the split feed reflux and side draw reflux heat exchange arrangement of FIG. 6, including reflux heat exchanger 652, may be combined with the feed gas heat exchanger 654, which is also employed in the systems of FIGS. 13 and 14.

Figure 16:
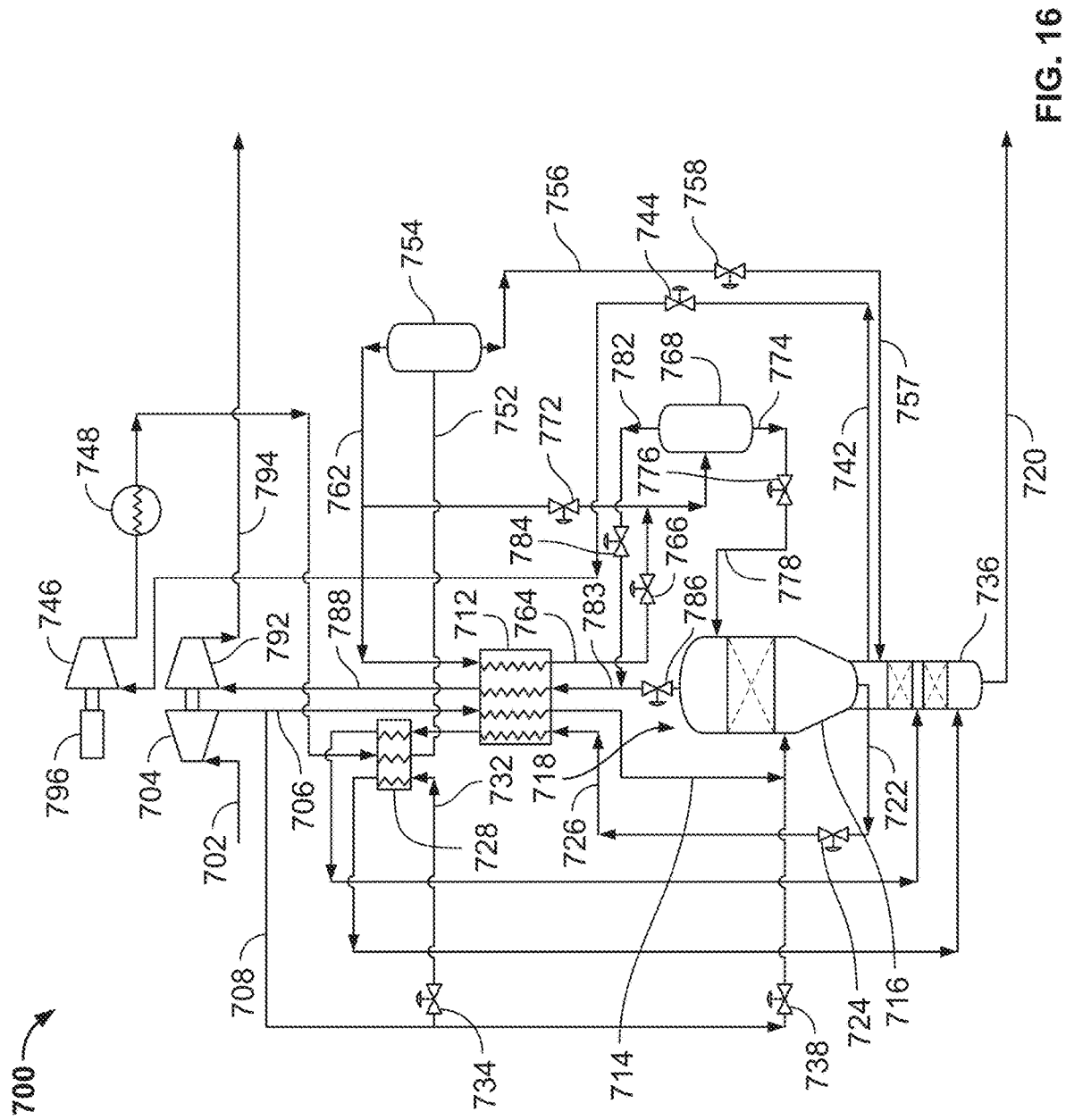
FIG. 16 is a process flow diagram and schematic illustrating a sixteenth embodiment of the heavy hydrocarbon removal system and method of the disclosure.

An embodiment of the system of the disclosure including a heat pump is indicated in general at 700 is illustrated in FIG. 16. In the system 700, a hydrocarbon feed gas stream 702 (such as a natural gas stream) enters a feed gas expander turbine 704 and the resulting expanded gas stream is split into a main feed stream 706 and a stripping gas feed stream 708.

The main feed stream 706, which contains the bulk of the feed gas stream 702, passes through a heavies removal heat exchanger 712 and is cooled and partially condensed. The resulting mixed phase stream 714 is then routed to a scrubbing section 716 of a heavies removal column, indicated in general at 718, where liquids are separated from the main feed vapor. An NGL condensate stream 720 containing heavy hydrocarbons exits the bottom of the stripping section 736. The resulting liquid stream 722, which contains a large portion of the feed gas heavy hydrocarbon/freezing components is directed to an optional expansion device 724 (such as a Joule-Thomson or JT valve) with the resulting mixed phase stream 726 being warmed in the heavies removal heat exchanger 712 and then to a stripping section heat exchanger 728 where it is further warmed and directed to stripping section 736 of the column 718. The stripping section heat exchanger 728 also receives a stream 732 after it has passed through a stripping gas feed expansion device 734 so that at least a portion of the stripping gas 708 is warmed prior to introduction into the stripping section 736 of column 718. The remaining portion of the stripping gas 708 is expanded via a scrub expansion device, such as JT valve 738, and joined with the mixed phase stream 714 that is routed to the scrubbing section 716.

A side draw vapor stream 742 exits the stripping section 736 of the column 718 and is cooled via a side draw expansion device, such as JT valve 744, with the resulting stream traveling to heat pump compressor 746. The compressed gas leaving the compressor 746 is cooled in reflux compressor aftercooler 748 and then cooled in stripping section heat exchanger 728 so that a mixed phase stream 752 is formed. Mixed phase stream 752 travels to a first reflux separation device, such as a warm reflux drum 754, and is separated into vapor and liquid portions. The liquid stream 756 from the warm reflux drum 754 is routed to the top portion of the stripping section 736 of the heavies removal column as reflux stream 757 after passing through an optional expansion device, such as JT valve 758.

With continued reference to FIG. 16, the vapor stream 762 from the warm reflux drum 754 travels to heavies removal exchanger 712 and is cooled and at least partially condensed. A resulting stream 764 travels through an optional expansion device, such as JT valve 766, to a second reflux separation device, such as cold reflux drum 768, and is separated into vapor and liquid portions. A portion of vapor stream 762 from the warm reflux drum 754 is split off and travels through an expansion device, such as JT valve 772, with the resulting mixed phase stream joining the mixed phase stream from JT valve 766 in traveling to cold reflux drum 768. The liquid stream 774 from the cold reflux drum 768 is routed to the top portion of the heavies removal column scrubbing section 716 as reflux stream 778 after passing through an optional control valve 776. Vapor stream 782 exits the top of cold reflux drum 768 and joins the scrubbed return vapor stream to form stream 783 after passing through an optional expansion device, such as JT valve 784.

The scrubbed return vapor stream exits the top of the column 718 and is then routed across an expansion device, such as JT valve 786, to produce cooling. The cooled return vapor stream is then combined with the stream from JT valve 784 (as noted previously) with the resulting stream 783 being routed to the heavies removal exchanger 712 where it is warmed and thereby provides cooling to other streams in the heat exchanger. After warming, the return vapor stream 788 is compressed by feed gas compressor 792 and sent as stream 794 to liquefaction so that a liquefied stream (such a liquid natural gas or LNG) is produced.

The feed gas compressor 792 is preferably powered by the feed gas expander turbine 704. The reflux compressor 746 may also be powered by the feed gas expander turbine 704 or alternatively with a dedicated motor 796.

Figure 17:
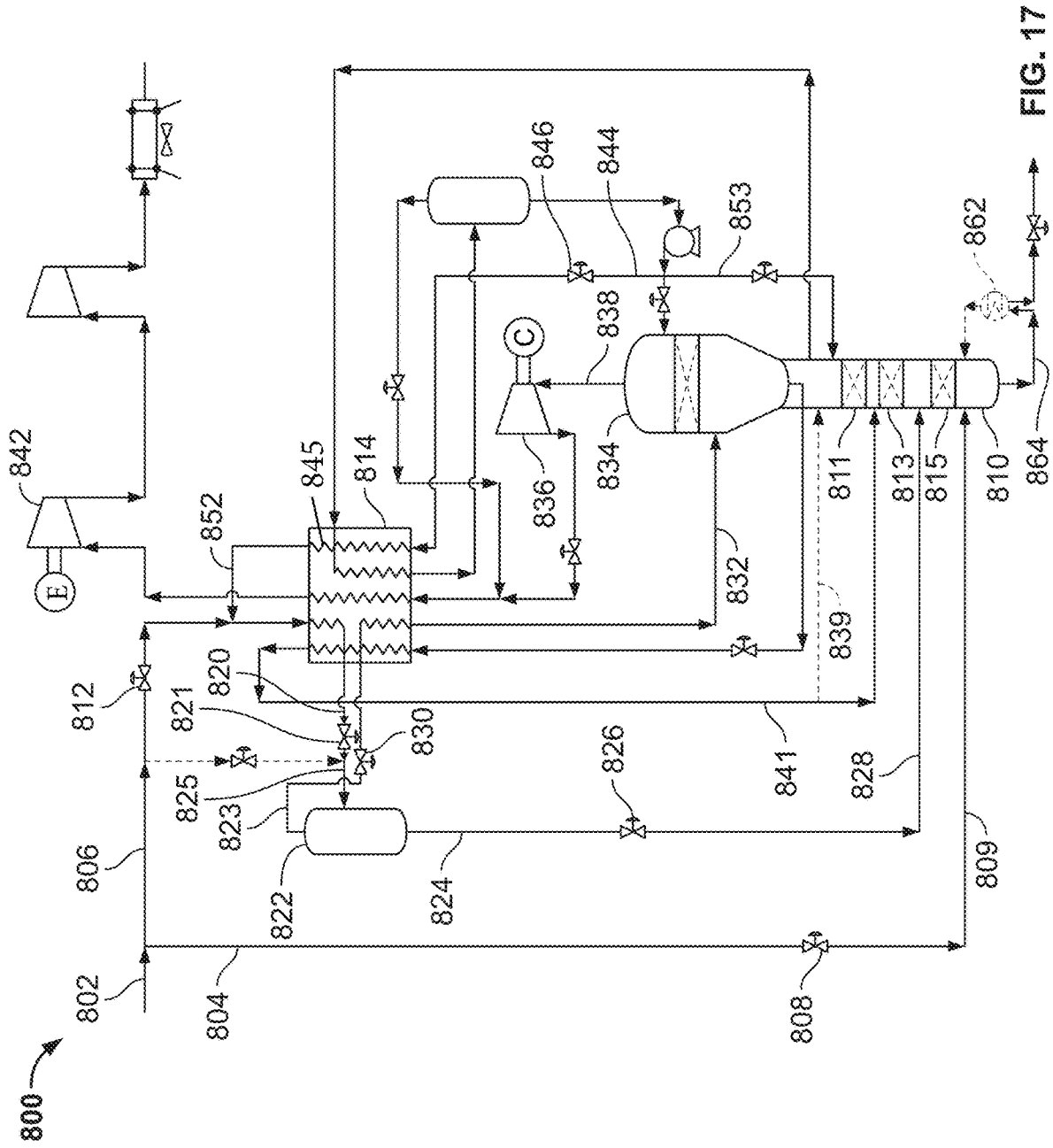
FIG. 17 is a process flow diagram and schematic illustrating a seventeenth embodiment of the heavy hydrocarbon removal system and method of the disclosure.

With reference to FIG. 17, a seventeenth embodiment of the system of the disclosure is indicated in general at 800. A hydrocarbon feed gas stream 802 (such as a natural gas stream) is split to form a stripping gas feed stream 804 and a main feed stream 806. As in previous embodiments, stripping gas feed stream 804 is expanded in expansion device 808 and directed as mixed phase stream 809 to a stripping section 810. The stripping section 810 may include an upper packing section 811, an added middle packing section 813 and lower packing section 815, with the stream 809 entering the stripping section below the lower packing section 815. As an example only, the packing sections may include beds of random packing with a distribution tray between each packing bed to red-distribute the liquid evenly over the beds. The beds could also be trays or even structured packing.

Main feed stream 806 is expanded in expansion device 812 with the resulting stream directed to heavies removal heat exchanger 814. The resulting mixed phase stream 820 is directed to a feed separation device 822 where it is separated into a vapor portion and a liquid portion. The liquid portion exits the feed separation device 822 as liquid stream 824 and, after expansion via separated feed liquid expansion device 826 is directed to the stripping section 810 of the heavies removal column.as mixed phase stream 828. Mixed phased stream 828 may enter the stripping section below the added middle packing section 813. With the additional mid-weight hydrocarbons from the reflux drum (via a reflux recycle stream described below), the additional middle packing section provides for improved separation of the freezing components. The additional middle packing section 813 is not required.

The vapor stream 823 exiting the top of the feed separation device 822, after expansion via expansion device 830, is cooled in the heavies removal heat exchanger 814. The resulting mixed phase stream 832 is directed to the scrubbing section 834 of the heavies removal column. By decreasing the pressure of the vapor stream 823 before the stream enters the heat exchanger 814, the temperature profiles of passages B and A2 of the heat exchanger 814 better match, providing better efficiency. This also allows the feed heat exchanger and reflux heat exchanger to be combined into a single unit. It also helps to reduce probability of formation of solids in the A2 heat exchanger passage.

As in the embodiment of FIG. 3, the system 800 of FIG. 17 uses a return vapor expander turbine 836 that receives the return vapor stream 838 from the heavies removal column 814. This return vapor expander turbine 836 preferably powers the feed gas compressor 842, where C and E in FIG. 17 represent this connection. In addition, as in the system of FIG. 10, the system 800 may include an optional branch 839 to the stripping section from the reboiler line 841 that leads from the heavies removal heat exchanger 814. Such an arrangement may be desirable when additional flow is required at the top of the stripping section to meet wetting criteria.

A reflux recycle line 844 includes a control valve 846 and receives a portion of the liquid reflux stream exiting the reflux pump 848. The reflux recycle stream in line 844 travels to a reflux recycle warming passage 845 in the heavies removal heat exchanger 814, where it is warmed and vaporized. The resulting stream 852 joins the main feed stream 806. In addition, an optional second reflux recycle line 853 may direct a portion of the liquid reflux stream exiting reflux pump 848 to the top of the stripping section.

The remaining aspects of the reflux handling system of FIG. 17 are the same as FIGS. 2 and 3.

The streams 844 and 852 provide mid-weight hydrocarbon components, such as propane, butane, etc. to the front of the process. These mid-weight hydrocarbons need to be provided in sufficient quantities so they will form a liquid phase at a temperature warmer than the desublimation temperature of the heavier weight freezing components, such as benzene and other similar components that enter the process. Returning the stream 844 through the heavies removal heat exchanger helps to balance the heat exchanger heating and cooling curves which improves the efficiency of the process. By vaporizing the stream 852 before mixing with the feed gas stream 806, the mixing process is improved and there is no concern of maldistribution into the feed stream.

In the system of FIG. 17, the inlet feed gas 806 is cooled to a temperature where a two phase flow 825 exiting expansion device 821 will exist at the process conditions of the feed separation vessel 822. The feed separation vessel 822 separates out the liquid phase 824, which contains much of the recycled mid-weight hydrocarbons from the reflux drum as well as most of the heavier freezing components. As noted previously, the liquid stream 824 is sent to the stripping section 810 of the column to separate out the high molecular weight hydrocarbons and freezing components.

In an alternative embodiment, the stream in reflux recycle line 844 may be mixed into the feed gas stream 806 before the heat exchanger 814 without warming the stream, but it may not be optimum. In an alternative embodiment, the recycle stream in line 844 can also be mixed at the exit of the passage A1 of the heavies removal heat exchanger 814 without warming the recycle stream through the heavies heat exchanger. This may also not be optimal since it risks poor mixing and could create poor separation in the feed separation vessel 822 due to poor distribution of the liquid/vapor flow regimes.

An additional section of packing is added to the stripping section of the column.

A reboiler 862 can be added as an optional item depending on the amount of mid-weight hydrocarbons that need to be recycled along with the amount of heavier freezing components and desire to produce NGL liquids in liquid stream 864 exiting the stripping section 810.

The system of FIG. 17 is best designed for a lean natural gas stream (low quantities of propanes, butanes, pentanes and heavier components) but with freezing contaminants in the incoming stream, such as benzenes or others. When a stream has very low concentrations of mid-weight hydrocarbons, it can be difficult to remove to an acceptable level the freezing components. The freezing components stay in the vapor phase and will tend to desublimate (freeze) directly from the vapor phase to solid before they can be drawn into a liquid phase. This takes place since there are limited amounts of mid-weight hydrocarbons which will only form a liquid phase at temperatures lower than the desublimation temperature of the freezing components.

Figure 18:
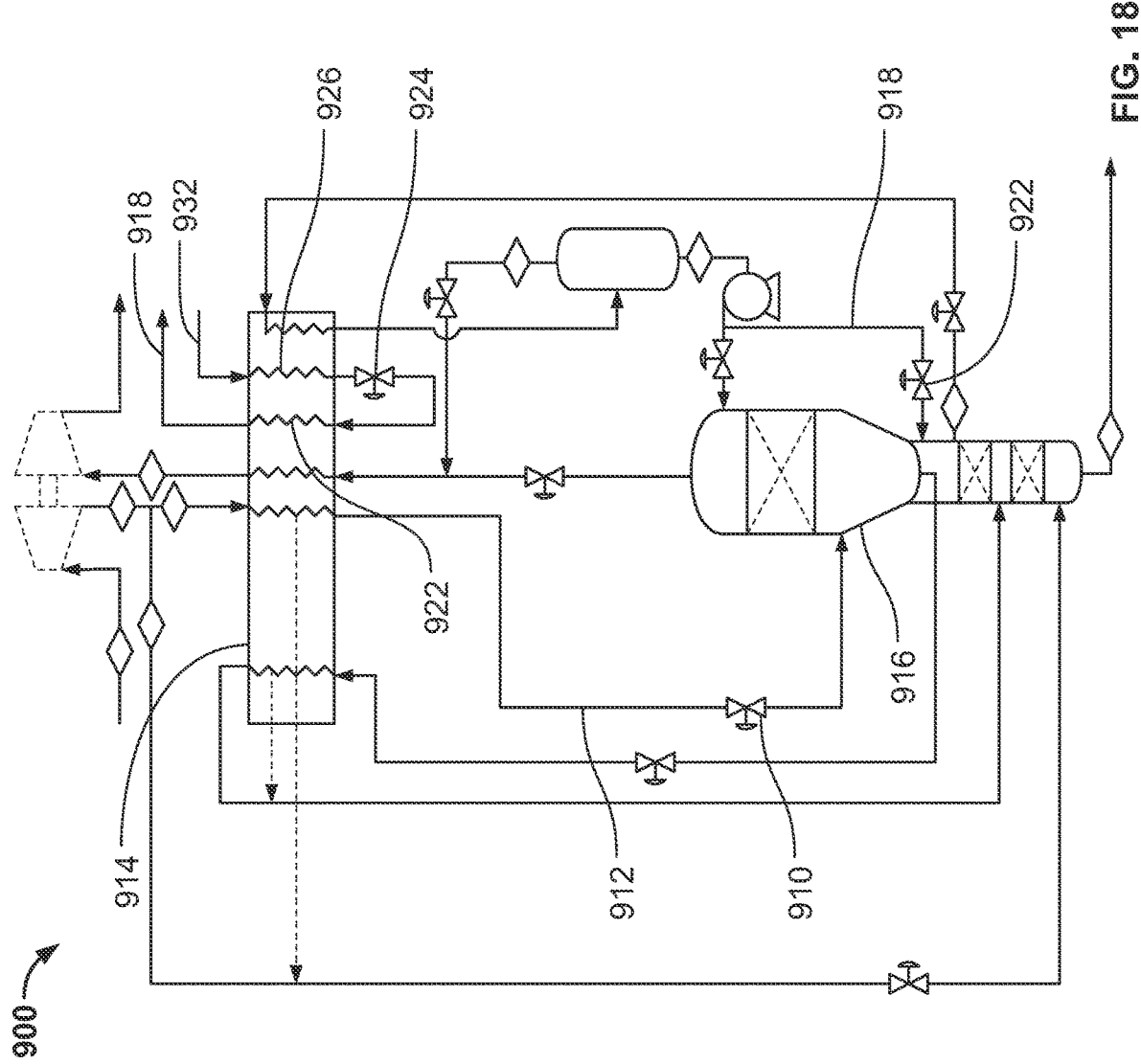
FIG. 18 is a process flow diagram and schematic illustrating a eighteenth embodiment of the heavy hydrocarbon removal system and method of the disclosure.

In an alternative embodiment of the system of the disclosure, indicated in general at 900 in FIG. 18, an expansion device 910 has been added to the line 912 leading from the heavies removal heat exchanger 914 to the scrubbing section 916 of a heavies removal column. As an example only, the expansion device 910 may be a valve (such as a JT valve) or a turbine. If the expansion device 910 is a turbine, it may be used to power a compressor. In some applications, expansion device 910 allows for the heavies removal column to operate at optimal pressure for improved separation.

In addition, a stream of a refrigerant 918, such as a mixed refrigerant from a liquefier, travels to passage 922 of the heavies removal heat exchanger 914 where it is cooled. The cooled stream is expanded via an expansion device 924 which may be, as an example only, a JT valve. The resulting stream flows through a supplemental refrigeration passage 926 to provide additional cooling in the heavies removal heat exchanger 914. The remaining components of the system of FIG. 18 may generally be the same and provide the same functionality as those illustrated in FIG. 2.

Figure 19:
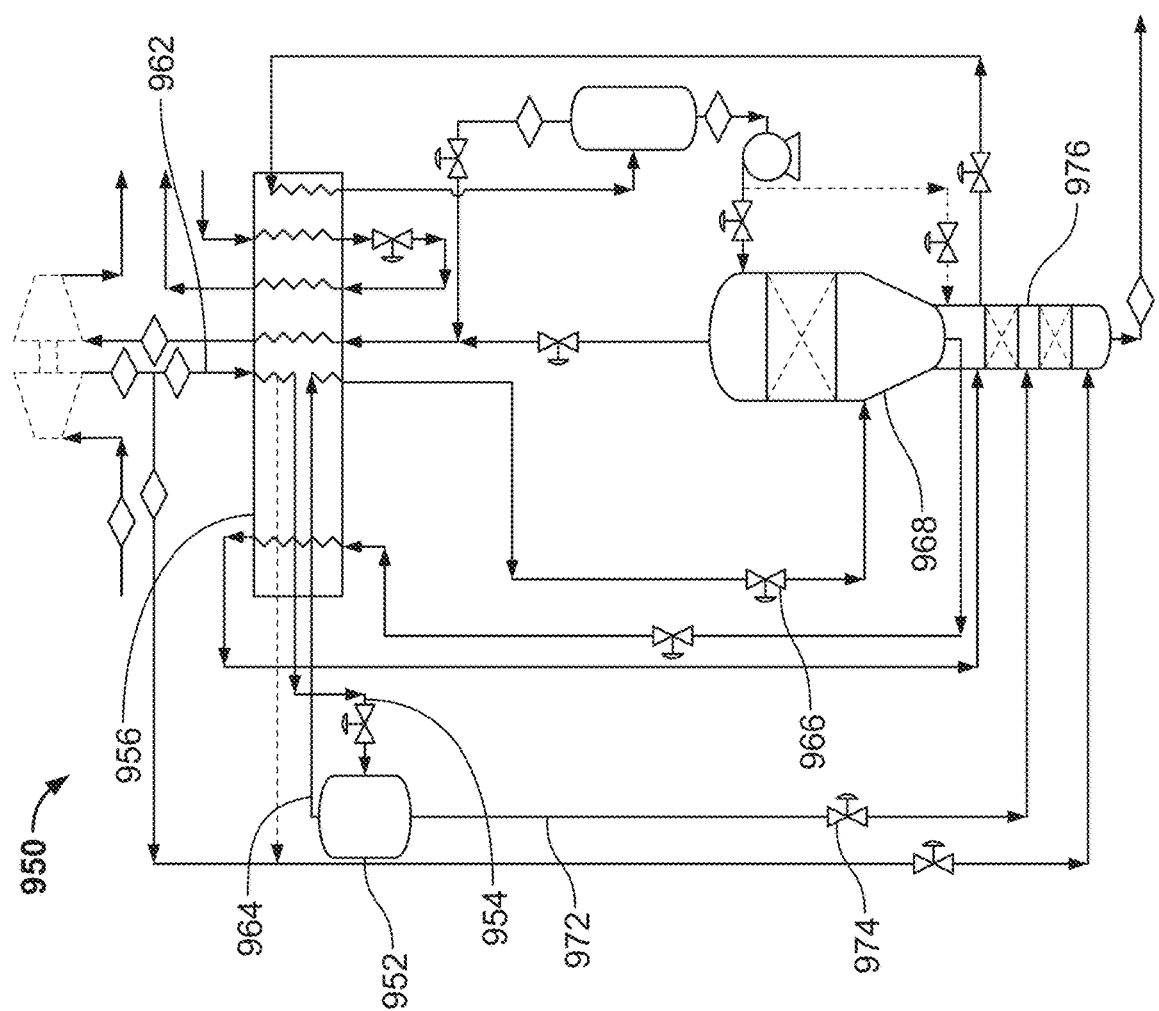
FIG. 19 is a process flow diagram and schematic illustrating a nineteenth embodiment of the heavy hydrocarbon removal system and method of the disclosure.

In the system of FIG. 19, indicated in general at 950, a separation device 952 has been added to the system of FIG. 18 to receive a stream 954 from the heavies removal heat exchanger 956. Stream 954 is produced after feed stream 962 passes partially through a passage of the heavies removal heat exchanger 956. The vapor stream 964 from the separation device 952 travels back to another passage of the heat exchanger 956 for further cooling before traveling to expansion device 966 and then to the scrubbing section 968 of the heavies removal column. The liquid stream 972 from the separation device 952 is directed through expansion device 974 and then to the scrubbing section 976 of the heavies removal column. Expansion device 974 may be, as an example only, a JT valve.

While the preferred embodiments of the invention have been shown and described, it will be apparent to those skilled in the art that changes and modifications may be made therein without departing from the spirit of the invention, the scope of which is defined by the appended claims.

What is claimed is:

1. A system for removing heavy hydrocarbon components from a feed gas stream comprising:
  a. a heavies removal heat exchanger having a main feed stream cooling passage, a reflux stream cooling passage and a return vapor stream warming passage;
  b. said main feed stream cooling passage of the heavies removal heat exchanger configured to receive and cool at least a portion of a main feed gas stream so as to produce a cooled main feed stream;
  c. a scrubbing section including a main feed inlet, a liquid outlet, a return vapor outlet and a reflux inlet, wherein said main feed inlet is in fluid communication with an outlet of the main feed stream cooling passage;
  d. a stripping section having a first fluid inlet, a second fluid inlet, a liquid outlet and a vapor outlet, said first fluid inlet configured to receive a fluid stream from the liquid outlet of the scrubbing section;
  e. a stripping gas feed expansion device having an inlet configured to receive another portion of the main feed gas stream, said stripping gas feed expansion device having an outlet in fluid communication with the second fluid inlet of the stripping section;
  f. a side draw vapor line configured to receive a vapor stream from the vapor outlet of the stripping section, said side draw vapor line in fluid communication with the reflux stream cooling passage of the heavies removal heat exchanger;
  g. a reflux separation device configured to receive fluid from the reflux cooling stream passage of the heavies removal heat exchanger, said reflux separation device including a liquid outlet and a vapor outlet, wherein the liquid outlet of the reflux separation device is in fluid communication with the reflux inlet of the scrubbing section;
  h. a return vapor expansion device having an inlet configured to receive a vapor stream from the return vapor outlet of the scrubbing section and an outlet configured to direct a cooled vapor stream to the return vapor stream warming passage of the heavies removal heat exchanger;
  i. said reflux separation device vapor outlet configured so that fluid passing therethrough joins with fluid that has exited the return vapor expansion device either before or after the fluid that has exited the return vapor expansion device flows through the return vapor stream warming passage of the heavies removal heat exchanger.

2. The system of claim 1 wherein the heavies removal heat exchanger includes a scrubber liquid reheat passage configured to receive a liquid stream from the liquid outlet of the scrubbing section and to warm and return a fluid stream to the first fluid inlet of the stripping section.

3. The system of claim 1 further comprising a scrubber liquid expansion device configured to receive a fluid stream from the liquid outlet of the scrubbing section and to return a fluid stream to the first fluid inlet of the stripping section.

4. The system of claim 1 further comprising a reflux pump configured to receive a liquid stream from the liquid outlet of the reflux separation device and to direct the received liquid stream to the reflux inlet of the scrubbing section.

5. The system of claim 4 further comprising a reflux liquid expansion device configured to receive the liquid stream from the reflux pump and to direct the liquid stream as an expanded liquid stream to the reflux inlet of the scrubbing section.

6. The system of claim 1 further comprising a reflux vapor expansion device having an inlet configured to receive vapor from the vapor outlet of the reflux separation device.

7. The system of claim 1 wherein the heavies removal heat exchanger includes a reflux vapor warming passage that is separate and distinct from the return vapor warming passage, said reflux vapor warming passage having an inlet configured to receive a fluid from the reflux separation device vapor outlet.

8. The system of claim 6 wherein the return vapor stream warming passage of the heavies removal heat exchanger is configured to receive a cooled vapor stream from the outlet of the reflux expansion device.

9. The system of claim 1 wherein the return vapor expansion device includes a valve, a Joule-Thomson valve or a turbine.

10. The system of claim 1 further comprising a feed gas expansion device configured to receive and expand at least a portion of a feed gas stream so as to produce an expanded feed gas stream and wherein the main feed stream cooling passage of the heavies removal heat exchanger is configured to receive and cool at least a portion of the expanded feed gas stream as the main feed gas stream so as to produce the cooled main feed stream, and wherein the feed gas expansion device is a valve, a Joule-Thomson valve or a turbine.

11. The system of claim 1 wherein the heavies removal heat exchanger also includes a supplemental reflux cooling passage and the reflux separation device includes a warm reflux drum and a cold reflux drum wherein the warm reflux drum has a warm reflux drum inlet configured to receive fluid from the reflux cooling stream passage of the heavies removal heat exchanger, a warm reflux drum liquid outlet in fluid communication with the stripping section and a warm reflux drum vapor outlet configured to direct fluid to the supplemental reflux cooling passage of the heavies removal heat exchanger and wherein said cold reflux drum has a cold reflux drum inlet configured to receive fluid from the supplemental reflux cooling passage of the heavies removal heat exchanger and a cold reflux drum liquid outlet in fluid communication with the reflux inlet of the scrubbing section.

12. The system of claim 10 wherein the heavies removal heat exchanger also includes a split feed reflux cooling passage configured to receive and cool a portion of the feed gas stream and further comprising a split feed reflux expansion device having an inlet configured to receive fluid from the split feed reflux cooling passage of the heavies removal heat exchanger, said split feed reflux expansion device also having an outlet in fluid communication with the scrubbing section.

13. The system of claim 12 further comprising a reflux heat exchanger configured to receive, warm and direct a fluid stream from the outlet of the split feed reflux expansion device to the scrubbing section, wherein the reflux heat exchanger is also configured to receive and cool a fluid stream from the reflux stream cooling passage of the heavies removal heat exchanger and to direct a resulting cooled stream to the reflux separation device.

14. The system of claim 1 wherein the heavies removal heat exchanger includes a feed separator bottoms reheat passage having an inlet and an outlet and further comprising:
   j. a feed separation device configured to receive the cooled main feed stream from the main feed stream cooling passage of the heavies removal heat exchanger, said feed separation device having a vapor outlet and a liquid outlet;
   k. a separated feed vapor expansion device configured to receive vapor from the vapor outlet of the feed separation device and to direct a fluid to the main feed inlet of the scrubbing section;
   l. a feed separator bottoms expansion device in fluid communication with the liquid outlet of the feed separation device, the feed separator bottoms reheat passage of the heat exchanger and the stripping section.

15. The system of claim 14 wherein the feed separator bottoms expansion device is configured to receive liquid from the liquid outlet of the feed separation device and to direct fluid to the inlet of the feed separator bottoms reheat passage of the heat exchanger.

16. The system of claim 14 wherein the feed separator bottoms expansion device is configured to receive fluid from the feed separator bottoms reheat passage of the heat exchanger and to direct fluid to the stripping section.

17. The system of claim 1 further comprising a split reflux line having an inlet in fluid communication with the liquid outlet of the reflux separation device, said split reflux line having an outlet in fluid communication with the stripping section.

18. The system of claim 1 wherein the return vapor outlet of the scrubbing section is configured to direct fluid to the reflux separation device.

19. The system of claim 1 further comprising a feed gas expansion device configured to receive and expand a feed gas stream so as to produce an expanded feed gas stream, where at least a portion of the expanded feed gas stream is directed as the main feed gas stream to the main feed stream cooling passage of the heavies removal heat exchanger.

20. The system of claim 19 further comprising a feed gas heat exchanger configured to receive and cool the feed gas stream prior to entering the feed gas expansion device, said feed gas heat exchanger also configured to receive and warm a portion of the expanded feed gas stream and direct a fluid to the inlet of the stripping gas feed expansion device.

21. The system of claim 1 further comprising:

j. a reflux compressor having an inlet configured to receive a fluid stream from the vapor outlet of the stripping section;
and wherein the reflux separation device includes a warm reflux drum and a cold reflux drum wherein the warm reflux drum has a warm reflux drum inlet in fluid communication with the outlet of the reflux compressor, a warm reflux drum liquid outlet in fluid communication with the stripping section and a warm reflux drum vapor outlet configured to direct fluid to the reflux stream cooling passage of the heavies removal heat exchanger and wherein said cold reflux drum has a cold reflux drum inlet configured to receive fluid from the reflux stream cooling passage of the heavies removal heat exchanger and a cold reflux drum liquid outlet in fluid communication with the reflux inlet of the scrubbing section.

22. The system of claim 1 wherein the scrubbing section and the stripping section are combined in a heavies removal column.

23. The system of claim 1 further comprising a feed gas compressor having an inlet configured to receive a fluid from the return vapor stream warming passage of the heavies removal heat exchanger and an outlet and wherein the return vapor outlet is in fluid communication with the inlet of the feed gas compressor.

24. The system of claim 23 further comprising a feed gas expansion device configured to receive and expand a feed gas stream so as to produce an expanded feed gas stream, where at least a portion of the expanded feed gas stream is directed to the main feed stream cooling passage of the heavies removal heat exchanger as the main feed gas stream and wherein the feed gas expansion device is a feed gas turbine configured to power the feed gas compressor.

25. The system of claim 23 wherein the return vapor expansion device includes a return vapor turbine configured to power the feed gas compressor.

26. The system of claim 23 wherein the outlet of the feed gas compressor is configured to direct a fluid to a liquefaction process.

27. The system of claim 26 further comprising a booster compressor configured to receive a fluid from the feed gas compressor and to direct a fluid to the liquefaction process.

28. The system of claim 1 wherein the stripping section includes a third fluid inlet and the heavies removal heat exchanger includes a scrubber liquid reheat passage configured to receive a fluid stream originating from the liquid outlet of the scrubbing section and to warm and return fluid streams to the first and third fluid inlets of the stripping section.

29. The system of claim 28 wherein the stripping section includes a top portion, a middle portion and a bottom portion with packing therebetween and the first fluid inlet is positioned in the middle portion, the second fluid inlet is positioned in the bottom portion and the third fluid inlet is positioned in the top portion.

30. The system of claim 1 further comprising:
   j. a stripping section heat exchanger having an inlet in fluid communication with the outlet of the stripping gas feed expansion device and an outlet in fluid communication with the second fluid inlet of the stripping section, said stripping section heat exchanger also in fluid communication with the liquid outlet of the scrubbing section and the first fluid inlet of the stripping section; and k. a scrub expansion device configured to receive a portion of a stream diverted from the inlet of the stripping gas feed expansion device, said scrub expansion device having an outlet in fluid communication with the scrubbing section.

31. The system of claim 1 further comprising a side draw expansion device configured to receive a vapor stream from the vapor outlet of the stripping section and to direct a fluid stream to the reflux stream cooling passage of the heavies removal heat exchanger.

32. The system of claim 1 wherein the heavies removal heat exchanger includes a feed separator vapor cooling passage having an inlet and an outlet and further comprising:
   j. a feed separation device having an inlet configured to receive the cooled main feed stream from the main feed stream cooling passage of the heavies removal heat exchanger, said feed separation device having a vapor outlet and a liquid outlet;
   k. a separated feed vapor expansion device in fluid communication with the vapor outlet of the feed separation device, the feed separator vapor cooling passage of the heavies removal heat exchanger and the scrubbing section;
   l. a separator bottoms expansion device configured to receive liquid from the liquid outlet of the feed separation device and to produce and direct an expanded bottoms stream to the stripping section.

33. The system of claim 32 wherein the stripping section includes a top packing section, a bottom packing section and middle packing section and wherein the expanded bottoms stream enters the stripping section between the middle and bottom packing sections.

34. The system of claim 33 wherein the heavies removal heat exchanger includes a reflux recycle warming passage having an outlet in fluid communication with the inlet of the feed separation device and an inlet in fluid communication with the liquid outlet of the reflux separation device.

35. The system of claim 33 wherein the heavies removal heat exchanger includes a scrubber liquid reheat passage configured to receive a liquid stream from the liquid outlet of the scrubbing section and to warm and return a first portion of a fluid stream above the top packing section of the stripping section and a second portion of the fluid stream between the top and middle packing sections.

36. The system of claim 33 wherein the heavies removal heat exchanger includes a scrubber liquid reheat passage configured to receive a liquid stream from the liquid outlet of the scrubbing section and to warm and return a fluid stream above the top packing section.

37. The system of claim 33 wherein the liquid outlet of the reflux separation device is also in fluid communication with the stripping section above the top packing section.

38. The system of claim 33 wherein the heavies removal heat exchanger includes a scrubber liquid reheat passage configured to receive a liquid stream from the liquid outlet of the scrubbing section and to warm and return a fluid stream between the top and bottom packing sections of the stripping section.

39. The system of claim 1 wherein the heavies removal heat exchanger includes a feed separation device reheat passage and further comprising:
   j. a feed separation device having an inlet configured to receive the cooled main feed stream from the main feed stream cooling passage of the heavies removal heat exchanger, said feed separation device having a vapor outlet and a liquid outlet, wherein the vapor outlet is in fluid communication with the scrubbing section; and
   k. wherein the feed separation device reheat passage includes an inlet in fluid communication with the liquid outlet of the feed separation device and an outlet configured to direct fluid to the stripping section.

40. The system of claim 1 further comprising:
   j. a reflux compressor having an inlet configured to receive a fluid stream from the vapor outlet of the stripping section;
   and wherein the reflux separation device includes a warm reflux drum and a cold reflux drum wherein the warm reflux drum has a warm reflux drum inlet in fluid communication with the outlet of the reflux compressor, a warm reflux drum liquid outlet in fluid communication with the stripping section and a warm reflux drum vapor outlet configured to direct fluid to the reflux stream cooling passage of the heavies removal heat exchanger and wherein said cold reflux drum has a cold reflux drum inlet configured to receive fluid from the reflux stream cooling passage of the heavies removal heat exchanger and a cold reflux drum liquid outlet in fluid communication with the reflux inlet of the scrubbing section;
   k. a feed gas expansion device configured to receive and expand a feed gas stream so as to produce an expanded feed gas stream, where at least a portion of expanded feed gas stream is directed to the main feed stream cooling passage of the heavies removal heat exchanger as the main feed gas stream and wherein the feed gas expansion device is a feed gas turbine configured to power the reflux compressor.

41. The system of claim 1 wherein the heavies removal heat exchanger also includes a supplemental reflux cooling passage and the reflux separation device includes a warm reflux drum and a cold reflux drum wherein the warm reflux drum has a warm reflux drum inlet configured to receive fluid from the reflux cooling stream passage of the heavies removal heat exchanger, a warm reflux drum liquid outlet in fluid communication with the stripping section and a warm reflux drum vapor outlet configured to direct fluid to the supplemental reflux cooling passage of the heavies removal heat exchanger and wherein said cold reflux drum has a cold reflux drum inlet configured to receive fluid from the supplemental reflux cooling passage of the heavies removal heat exchanger, a cold reflux drum liquid outlet in fluid communication with the reflux inlet of the scrubbing section and a cold reflux drum vapor outlet, and further comprising a feed gas compressor having an inlet configured to receive a fluid from the return vapor stream warming passage of the heavies removal heat exchanger and an outlet and wherein the cold reflux drum vapor outlet is in fluid communication with the inlet of the feed gas compressor.

42. The system of claim 1 wherein the stripping section includes a third fluid inlet and the heavies removal heat exchanger includes a scrubber liquid reheat passage configured to receive a first portion of a fluid stream originating from the liquid outlet of the scrubbing section and to warm and return the first portion of the fluid stream to the first fluid inlet of the stripping section and further comprising a passage configured to direct a second portion of the fluid stream originating from the liquid outlet of the scrubber section to the third fluid inlet of the stripping section.

43. The system of claim 1 wherein the heavies removal heat exchanger includes a scrubber liquid reheat passage configured to receive a liquid stream from the liquid outlet of the scrubbing section and to warm and return a fluid stream to the first fluid inlet of the stripping section and wherein the heavies removal heat exchanger also includes a supplemental reflux cooling passage and the reflux separation device includes a warm reflux drum and a cold reflux drum wherein the warm reflux drum has a warm reflux drum inlet configured to receive fluid from the reflux cooling stream passage of the heavies removal heat exchanger, a warm reflux drum liquid outlet in fluid communication with the stripping section and a warm reflux drum vapor outlet configured to direct fluid to the supplemental reflux cooling passage of the heavies removal heat exchanger and wherein said cold reflux drum has a cold reflux drum inlet configured to receive fluid from the supplemental reflux cooling passage of the heavies removal heat exchanger and a cold reflux drum liquid outlet in fluid communication with the reflux inlet of the scrubbing section and wherein the stripping section includes two packing layers.

44. A method for removing heavy hydrocarbon components from a feed gas stream comprising the steps of:
   a. splitting a feed gas stream into a main feed stream that includes a majority portion of the expanded feed gas stream and a stripping gas feed stream;
   b. cooling the main feed stream in a heavies removal heat exchanger;
   C. directing the cooled main feed stream to a scrubbing section;
   d. separating the cooled main feed stream into a main stream vapor portion and a main stream liquid portion in the scrubbing section
   e. expanding the stripping gas feed stream;
   f. directing the expanded stripping gas feed stream to a stripping section;
   g. separating the stripping gas feed stream into a stripping vapor portion and a stripping liquid portion in the stripping section;
   h. expanding a stream that originated as the main stream liquid portion to create a main fluid stream;
   i. directing the main fluid stream to the stripping section;
   j. cooling the stripping vapor portion to create a reflux mixed phase stream;
   k. separating the reflux mixed phase stream into a reflux vapor portion and a reflux liquid portion;
   l. directing the reflux liquid portion to the scrubbing section;
   m. expanding the main stream vapor portion;
   n. warming the expanded main stream vapor portion in the heavies removal heat exchanger to cool the main feed stream;
   o. expanding the reflux vapor portion;
   p. warming the expanded reflux vapor portion in the heavies removal heat exchanger to cool the main feed stream.

45. The method of claim 44 further comprising the step of expanding the feed gas stream prior to step a. and wherein step a. includes splitting the expanded feed gas stream.

46. The method of claim 45 further comprising the step of:
   q. compressing the warmed expanded main stream vapor portion and the warmed expanded reflux vapor portion.

47. The method of claim 46 wherein the expansion prior to step a. is performed in a feed turbine and the compression of step q. is performed in a feed gas compressor, where the feed gas compressor is powered by the feed turbine.

48. The method of claim 44 further comprising the step of:
   q. compressing the warmed expanded main stream vapor portion and the warmed expanded reflux vapor portion.

49. The method of claim 48 wherein the compressing of step q. uses power from a motor and turbine connected to a generator.

* * * * *